United States Patent
Kondo et al.

(10) Patent No.: US 10,784,500 B2
(45) Date of Patent: Sep. 22, 2020

(54) POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

(71) Applicant: SUMITOMO METAL MINING CO., LTD., Tokyo (JP)

(72) Inventors: Kentaro Kondo, Niihama (JP); Jun Yokoyama, Niihama (JP); Yuki Furuichi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 212 days.

(21) Appl. No.: 15/582,968

(22) Filed: May 1, 2017

(65) Prior Publication Data
US 2018/0315997 A1    Nov. 1, 2018

(51) Int. Cl.
*H01M 4/131*     (2010.01)
*H01M 4/04*      (2006.01)
(Continued)

(52) U.S. Cl.
CPC ............ *H01M 4/131* (2013.01); *H01M 4/04* (2013.01); *H01M 4/1391* (2013.01);
(Continued)

(58) Field of Classification Search
CPC ..................................................... H01M 4/131
(Continued)

(56) References Cited

U.S. PATENT DOCUMENTS

2010/0209771 A1    8/2010  Shizuka et al.
2013/0011740 A1*   1/2013  Konishi ............... H01M 4/525
                                                        429/223
(Continued)

FOREIGN PATENT DOCUMENTS

JP        11-16566 A      1/1999
JP     2005-251716 A      9/2005
(Continued)

*Primary Examiner* — James M Erwin
(74) *Attorney, Agent, or Firm* — Westerman, Hattori, Daniels & Adrian, LLP

(57) ABSTRACT

In one aspect, a method for producing a positive electrode active material for a nonaqueous electrolyte secondary battery, includes mixing first lithium nickel composite oxide particles containing lithium tungstate and second lithium nickel composite oxide particles not containing lithium tungstate. The first lithium nickel composite oxide particles have a composition represented by $Li_{z1}Ni_{1-x1-y1}Co_{x1}M^1_{y1}O_2$, and include a core material containing secondary particles each corresponding to an aggregation of a plurality of primary particles, and the lithium tungstate existing on at least a part of a surface of the primary particles on a surface of and inside the first lithium nickel composite oxide particles. The second lithium nickel composite oxide particles have a composition represented by $Li_{z2}Ni_{1-x2-y2}Co_{x2}M^2_{y2}O_2$, and include secondary particles each corresponding to an aggregation of a plurality of primary particles.

23 Claims, 7 Drawing Sheets

(51) Int. Cl.
*H01M 4/66* (2006.01)
*H01M 4/62* (2006.01)
*H01M 10/0525* (2010.01)
*H01M 4/1391* (2010.01)
*H01M 4/36* (2006.01)
*H01M 4/02* (2006.01)

(52) U.S. Cl.
CPC ............. *H01M 4/366* (2013.01); *H01M 4/62* (2013.01); *H01M 4/621* (2013.01); *H01M 4/663* (2013.01); *H01M 10/0525* (2013.01); *H01M 2004/028* (2013.01)

(58) Field of Classification Search
USPC .......................................................... 429/322
See application file for complete search history.

(56) References Cited

U.S. PATENT DOCUMENTS

2015/0021518 A1   1/2015   Kokado et al.
2017/0141391 A1*  5/2017   Jito ........................ H01M 4/525

FOREIGN PATENT DOCUMENTS

| JP | 2009-289726 A |   | 12/2009 |
|----|---------------|---|---------|
| JP | 2010-40383 A  |   | 2/2010  |
| JP | 2013152866 A  | * | 8/2013  |
| JP | 2013-171785 A |   | 9/2013  |

* cited by examiner

POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

TECHNICAL FIELD

The present invention relates to a positive electrode active material for a nonaqueous electrolyte secondary battery, a method for producing the same, and a nonaqueous electrolyte secondary battery.

BACKGROUND ART

With the recent wide spread use of portable electronic devices such as mobile phones and laptop computers, the development of small and light-weight secondary batteries having high energy density has been strongly demanded. Moreover, the development of secondary batteries with high output energy serving as the batteries for electric vehicles typified by hybrid vehicles has been strongly demanded.

An example of the secondary batteries that satisfy these demands includes nonaqueous electrolyte secondary batteries typified by lithium ion secondary batteries. A lithium ion secondary battery includes a negative electrode, a positive electrode, an electrolyte solution, and the like. For an active material of the negative electrode and the positive electrode, a material capable of intercalation and deintercalation of lithium is used.

Such nonaqueous electrolyte secondary batteries have been extensively researched and developed. Above all, the practical application of the lithium ion secondary battery whose positive electrode material contains lithium nickel composite oxide with a layered structure or a spinel structure has been advanced as a battery with high energy density because a voltage as high as 4 V can be obtained.

Examples of materials mainly suggested so far include lithium cobalt composite oxide ($LiCoO_2$), which is obtained by relatively easy synthesis, lithium nickel composite oxide ($LiNiO_2$) and lithium nickel cobalt manganese composite oxide ($LiNi_{1/3}Co_{1/3}Mn_{1/3}O_2$), which contain nickel less expensive than cobalt, and lithium manganese composite oxide ($LiMn_2O_4$), which contains manganese. Among these, the lithium nickel composite oxide has attracted attention as the material with an excellent cycle characteristic, by which high output energy can be obtained with low resistance. Pursuing lower resistance required for higher output energy has been regarded as important recently.

To achieve lower resistance, a different element is added; in particular, the transition metal that can have a high valence, such as W, Mo, Nb, Ta, or Re, is thought to be useful. For example, Patent Literature 1 has provided powder of a lithium transition metal compound for a positive electrode material of a lithium ion secondary battery, which contains one or more elements selected from Mo, W, Nb, Ta, and Re by 0.1 to 5 mol % relative to the total molar quantity of Mn, Ni, and Co. The atomic ratio of the total of Mo, W, Nb, Ta, and Re relative to the total of the metal elements other than Li and Mo, W, Nb, Ta, and Re on the surface part of the primary particles is thought to be preferably five or more times the atomic ratio of all the primary particles. According to this literature, all of the lower cost, the higher safety, the higher load characteristic, and the higher powder handling properties of powder of the lithium transition metal compound for a positive electrode material of a lithium secondary battery can be achieved.

Powder of the lithium transition metal compound is obtained by spraying and drying slurry, in which the raw material is crushed in a liquid solvent to be uniformly diffused therein, and firing the obtained sprayed and dried substance. In this case, a part of the different element such as Mo, W, Nb, Ta, or Re is replaced by Ni disposed in the layer form and a problem occurs that a battery characteristic such as battery capacity or a cycle characteristic deteriorates.

Patent Literature 2 has provided a positive electrode active material for a nonaqueous electrolyte secondary battery having at least lithium transition metal composite oxide with a layered structure, in which the lithium transition metal composite oxide exists in the form of particles including one or both of primary particles and secondary particles each corresponding to an aggregation of the primary particles, and at least a surface of the particles has a compound containing at least one kind selected from the group consisting of molybdenum, vanadium, tungsten, boron, and fluorine. According to this literature, the positive electrode active material for a nonaqueous electrolyte secondary battery having an excellent battery characteristic even under a more severe use environment can be obtained. In particular, by having the compound containing at least one kind selected from the group consisting of molybdenum, vanadium, tungsten, boron, and fluorine, initial characteristics can be improved without impairing the improvement in thermal stability, load characteristic, and output characteristic.

However, the effect obtained by adding at least one element selected from the group consisting of molybdenum, vanadium, tungsten, boron, and fluorine is the improvement in the initial characteristics, that is, initial discharging capacity and initial efficiency, and no output characteristic is discussed. In the producing method according to Patent Literature 2, an added element is mixed and fired with the hydroxide that is thermally processed at the same time with the lithium compound, so that a part of the added element replaces nickel disposed in the layer form, and thus a battery characteristic may deteriorate.

Patent Literature 3 has provided a positive electrode active material covered with a metal containing at least one kind selected from Ti, Al, Sn, Bi, Cu, Si, Ga, W, Zr, B, and Mo, and/or a metal-metal compound obtained by a combination of a plurality of those elements, and/or an oxide thereof. According to the literature, such covering enables the absorption of oxygen gas and ensures safety but an output characteristic is not disclosed at all. In the disclosed producing method, a planetary ball mill is used for covering, and this covering method causes physical damage on a positive electrode active material, so that a battery characteristic deteriorates.

Patent Literature 4 has provided a positive electrode active material, which is formed by heating after depositing a tungstic acid compound to composite oxide particles mainly containing lithium nickelate, containing carbonate ions by 0.15% by weight or less. According to this literature, the tungstic acid compound or a decomposed tungstic acid compound exists on the surface of a positive electrode active material, and oxidizing activity on the surface of the composite oxide particles in the charged state is suppressed, and therefore gas generation due to decomposition of a nonaqueous electrolyte or the like can be suppressed but this literature does not disclose any output characteristic at all.

In a producing method according to Patent Literature 4, preferably, a solution, in which a sulfuric acid compound, a nitric acid compound, a boric acid compound, or a phosphoric acid compound is dissolved in a solvent together with a tungstic acid compound, as a deposition component is deposited on composite oxide particles heated over the boiling point of the solution where the deposition component has been dissolved. In this method, since the solvent is removed in a short time, a problem occurs in that the tungsten compound is not diffused sufficiently on the surface of the composite oxide particles, preventing uniform deposition.

Improvements for higher output energy of lithium nickel composite oxide have been attempted. For example, Patent Literature 5 has provided a positive electrode active material for a nonaqueous electrolyte secondary battery including microparticles containing lithium tungstate represented by any of $Li_2WO_4$, $Li_4WO_5$, and $Li_6W_2O_9$ on a surface of the lithium nickel composite oxide including primary particles and secondary particles each corresponding to an aggregation of the primary particles. According to this literature, high capacity and high output energy are obtained.

CITATION LIST

Patent Literature

[Patent Literature 1] Japanese Unexamined Patent Application Publication No. 2009-289726
[Patent Literature 2] Japanese Unexamined Patent Application Publication No. 2005-251716
[Patent Literature 3] Japanese Unexamined Patent Application Publication No. 11-16566
[Patent Literature 4] Japanese Unexamined Patent Application Publication No. 2010-40383
[Patent Literature 5] Japanese Unexamined Patent Application Publication No. 2013-171785

SUMMARY OF INVENTION

Technical Problem

In Patent Literature 5, the output energy is increased while the high capacity is retained, but further increase in capacity has been required. Moreover, since tungsten is a rare element and expensive, it is necessary to reduce its use quantity. In addition, since tungsten is added in the middle of a production process, the production line after the addition of the tungsten is contaminated with tungsten. Therefore, it is necessary to clean the line if producing various kinds of products, and thus the increase in number of steps and the decrease in operation rate are referred to as the problem.

The present invention has been made in view of the above problems, and an object is to provide a positive electrode active material for a nonaqueous electrolyte secondary battery, which has high capacity and high output energy and contains a reduced amount of tungsten when used for a nonaqueous electrolyte secondary battery as the positive electrode active material. In addition, another object is to provide a method for producing a positive electrode active material for a nonaqueous electrolyte secondary battery that can be produced easily, has high productivity, and is suitable for producing various kinds of products.

Solution to Problem

To solve the above problems, in a first aspect of the present invention, a method for producing a positive electrode active material for a nonaqueous electrolyte secondary battery includes mixing first lithium nickel composite oxide particles containing lithium tungstate and second lithium nickel composite oxide particles not containing lithium tungstate. The first lithium nickel composite oxide particles have a composition represented by $Li_{z1}Ni_{1-x1-y1}Co_{x1}M^1_{y1}O_2$ (where $0 \leq x1 \leq 0.35$, $0 \leq y1 \leq 0.35$, $0.95 \leq z1 \leq 1.15$, and $M^1$ is at least one element selected from Mn, V, Mg, Mo, Nb, Ti, and Al), and include a core material containing secondary particles each corresponding to an aggregation of a plurality of primary particles, and the lithium tungstate existing on at least a part of a surface of the primary particles on a surface of and inside the second composite oxide particles. The second lithium nickel composite oxide particles have a composition represented by $Li_{z2}Ni_{1-x2-y2}Co_{x2}M^2_{y2}O_2$ (where $0 \leq x2 \leq 0.35$, $0 \leq y2 \leq 0.35$, $0.95 \leq z2 \leq 1.15$, and $M^2$ is at least one element selected from Mn, V, Mg, Mo, Nb, Ti, and Al), and include secondary particles each corresponding to an aggregation of a plurality of primary particles.

The second lithium nickel composite oxide particles may be washed with water before the mixing. In the water-washing, slurry may have a concentration of 500 g/L or higher and 2,500 g/L or lower. The amount of lithium contained in a lithium compound other than the lithium tungstate existing on the surface of the primary particles on a surface of and inside both the first lithium nickel composite oxide particles and the second lithium nickel composite oxide particles may be 0.05% by mass or less relative to the total amount of the positive electrode active material. The first lithium nickel composite oxide particles and the second lithium nickel composite oxide particles may be mixed so that the positive electrode active material contains the first lithium nickel composite oxide by 10% by mass or more relative to the total amount of the positive electrode active material. The first lithium nickel composite oxide particles and the second lithium nickel composite oxide particles may be mixed so that the first lithium nickel composite oxide particles contain tungsten by 0.03 at % or more and 2.5 at % or less relative to the total number of atoms of Ni, Co, and M contained in the positive electrode active material.

The method for producing a positive electrode active material for a nonaqueous electrolyte secondary battery may include before the mixing, preparing a tungsten mixture containing a base material whose composition is represented by $Li_{z3}Ni_{1-x3-y3}Co_{x3}M^1_{y3}O_2$ (where $0.03 \leq x3 \leq 0.35$, $0.01 \leq y3 \leq 0.35$, $0.95 \leq z3 \leq 1.20$, and $M^1$ is at least one element selected from Mn, V, Mg, Mo, Nb, Ti, and Al) and that includes secondary particles each corresponding to an aggregation of a plurality of primary particles, water of 2% by mass or more relative to the total amount of the base material, a tungsten compound or a tungsten compound and a lithium compound not containing a tungsten; and obtaining the first lithium nickel composite oxide particles by performing heat treatment on the obtained tungsten mixture to form the lithium tungstate on the surface of the primary particles on a surface of and inside the base material, in which in the tungsten mixture, a molar ratio of the total amount of lithium contained in the water and the tungsten compound or in the water, the tungsten compound, and the lithium compound relative to the total amount of contained tungsten may be 5 or less. In the first lithium nickel composite oxide particles, the amount of lithium contained in the lithium compound other than the lithium tungstate existing on the surface of the primary particles on the surface of and inside the first lithium nickel composite oxide particles is 0.05% by mass or less relative to the first lithium nickel composite oxide particles. The method for producing a positive electrode active material for a nonaqueous electrolyte secondary battery may include: before the heat treatment, washing the base material with water by mixing the base material and water to form slurry; and separating the washed base material into a solid and a liquid. The slurry formed by washing the base material with water may have a concentration of 500 g/L or higher and 2,500 g/L or lower. The water content of a washed cake obtained when the washed base material is separated into the solid and the liquid may be controlled to be in a range of 3.0% by mass or more and 15.0% by mass or less. The tungsten compound may contain at least one of tungsten oxide ($WO_3$), tungstic acid ($WO_3 \cdot H_2O$), $Li_2WO_4$, $Li_4WO_5$, and $Li_6W_2O_9$. The heat treatment may be performed at 100° C. or higher and 600° C. or lower. The amount of tungsten contained in the tungsten compound may be 0.05 at % or more and 3.0 at % or less relative to the total number of atoms of Ni, Co, and M contained in the base material.

In a second aspect, a positive electrode active material for a nonaqueous electrolyte secondary battery includes first lithium nickel composite oxide particles containing lithium tungstate and second lithium nickel composite oxide particles not containing lithium tungstate. The first lithium nickel composite oxide particles have a composition represented by $Li_{z1}Ni_{1-x1-y1}Co_{x1}M^1_{y1}O_2$ (where $0 \leq x1 \leq 0.35$, $0 \leq y1 \leq 0.35$, $0.95 \leq z1 \leq 1.15$, and $M^1$ is at least one element selected from Mn, V, Mg, Mo, Nb, Ti, and Al), and include a core material containing secondary particles each corresponding to an aggregation of a plurality of primary particles, and the lithium tungstate existing on at least a part of a surface of the primary particles on a surface of and inside the second composite oxide particles. The second lithium nickel composite oxide particles have a composition represented by $Li_{z2}Ni_{1-x2-y2}Co_{x2}M^2_{y2}O_2$ (where $0 \leq x2 \leq 0.35$, $0 \leq y2 \leq 0.35$, $0.95 \leq z2 \leq 1.15$, and $M^2$ is at least one element selected from Mn, V, Mg, Mo, Nb, Ti, and Al), and include secondary particles each corresponding to an aggregation of a plurality of primary particles.

The amount of lithium contained in a lithium compound other than the lithium tungstate existing on a surface of the primary particles on a surface of and inside both the first lithium nickel composite oxide particles and the second composite oxide particles may be 0.05% by mass or less relative to the total amount of the positive electrode active material. The positive electrode active material may contain the first lithium nickel composite oxide particles by 10% by mass or more relative to the total amount of the positive electrode active material. The lithium tungstate may contain tungsten by 0.03 at % or more and 2.5 at % or less relative to the total number of atoms of Ni, Co, and M contained in the positive electrode active material. The lithium tungstate may contain tungsten by 0.05 at % or more and 3.0 at % or less relative to the total number of atoms of Ni, Co, and M contained in the tungsten covered composite oxide particles. The lithium tungstate may exist as a microparticle with a particle diameter of 1 nm or larger and 500 nm or smaller on the surface of the primary particles on the surface of and inside the first lithium nickel composite oxide particles. The lithium tungstate may exist as a film with a thickness of 1 nm or larger and 200 nm or smaller on the surface of the primary particles on the surface of and inside the first lithium nickel composite oxide particles. The lithium tungstate may exist both as a microparticle with a particle diameter of 1 nm or larger and 500 nm or smaller and as a film with a thickness of 1 nm or larger and 200 nm or smaller on the surface of the primary particles on the surface of and inside the first lithium nickel composite oxide particles.

In a third aspect of the present invention, a nonaqueous electrolyte secondary battery includes a positive electrode containing the positive electrode active material for a nonaqueous electrolyte secondary battery.

Advantageous Effects of the Invention

According to the present invention, a positive electrode active material for a nonaqueous electrolyte secondary battery, which has high capacity and high output energy and contains a reduced amount of tungsten when used for a positive electrode active material of a secondary battery is obtained. In addition, a method for producing the same is easily performed and highly productive, and suitable for the production in the industrial scale; therefore, the industrial value thereof is very high.

DESCRIPTION OF EMBODIMENTS

An embodiment of the present invention will hereinafter be described with reference to the drawings. In order to clarify each configuration, some parts are emphasized or simplified throughout the drawings and a shape, a scale, and the like may be different from the actual ones. The present embodiment will be described below.

Figure 1A:
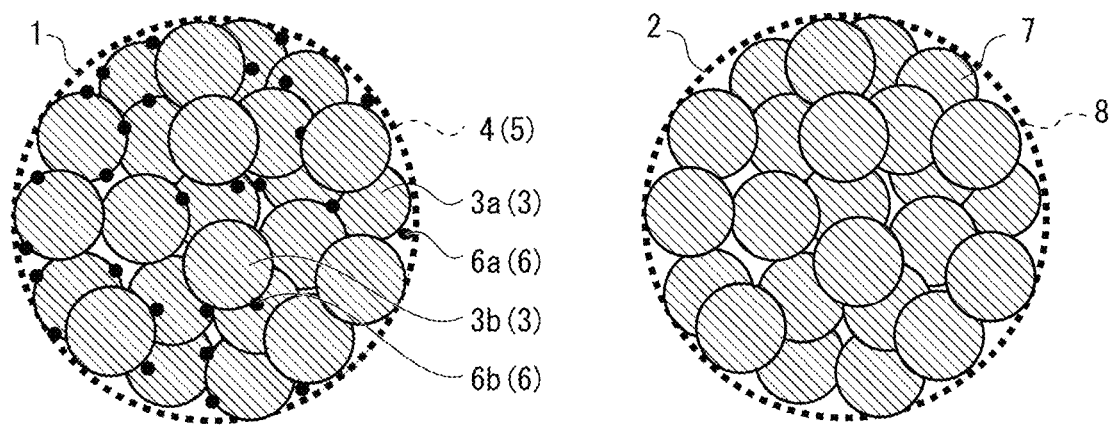
FIG. 1A is a schematic diagram illustrating one example of a positive electrode active material according to an embodiment.
Figure 1B:
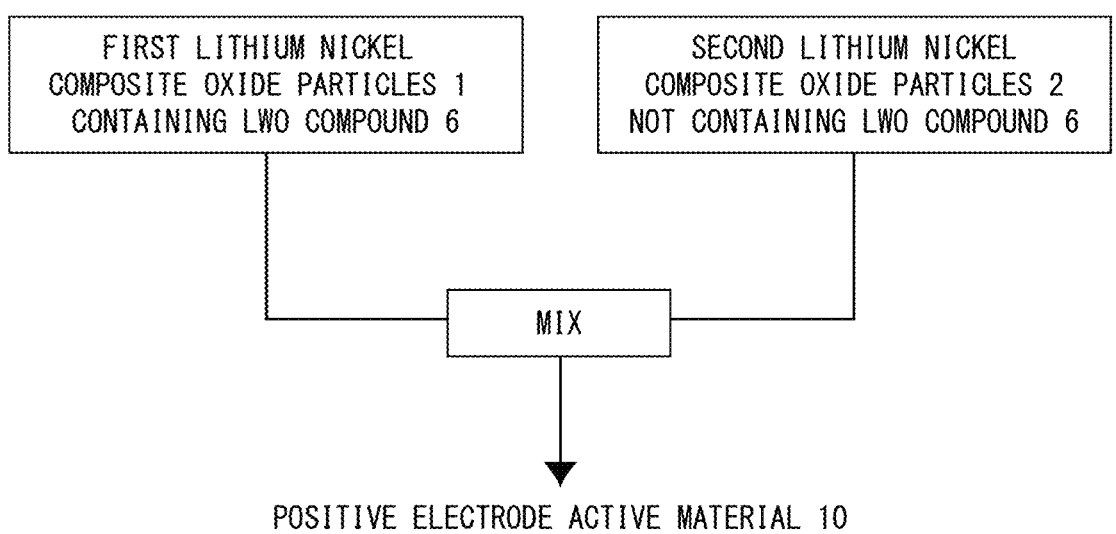
FIG. 1B illustrates one example of a method for producing the same.

1. Positive Electrode Active Material for Nonaqueous Electrolyte Secondary Battery, and Method for Producing the Same FIG. 1A is a schematic view illustrating one example of a positive electrode active material 10 for a nonaqueous electrolyte secondary battery according to the present embodiment (hereinafter may simply be referred to as "positive electrode active material"). FIG. 1B is a diagram illustrating one example of a method for producing the positive electrode active material 10 according to the present embodiment. First, the positive electrode active material 10 is described and next, a method for producing the positive electrode active material 10 and a nonaqueous electrolyte secondary battery including the positive electrode active material 10 (hereinafter may simply be referred to as "secondary battery") will be described.

(1) Positive Electrode Active Material for Nonaqueous Electrolyte Secondary Battery As illustrated in FIG. 1A, the positive electrode active material 10 includes first lithium nickel composite oxide particles 1 containing lithium tungstate (hereinafter also referred to as "first composite oxide particles") and second lithium nickel composite oxide particles 2 not containing lithium tungstate (hereinafter also referred to as "second composite oxide particles").

The first composite oxide particle 1 includes a core material 5 including secondary particles 4 each corresponding to an aggregation of a plurality of primary particles 3, and lithium tungstate 6 (6a and 6b) existing on at least a part of a surface of the primary particles 3 (3a and 3b) on a surface of and inside the first composite oxide particle 1 (core material). The first composite oxide particle 1 contains the lithium tungstate 6 on the surface of the primary particles 3. Therefore, when the positive electrode active material 10 is used for the secondary battery, high output energy can be obtained and high charging-discharging capacity (hereinafter also called "battery capacity") can be improved.

In general, when the surface of the lithium nickel composite oxide particle is covered with a different kind of compound completely, the transfer of lithium ions (intercalation) is limited largely, so that the advantage of high capacity of the lithium nickel composite oxide may be lost.

On the other hand, the first composite oxide particle used in the present embodiment contains the lithium tungstate 6 on the surface of the primary particles 3 (3a, 3b) on the surface of and inside the first composite oxide particle 1 (hereinafter the lithium tungstate may be referred to as "LWO compound"). This LWO compound 6 has high lithium ion conductivity and has an effect of promoting the transfer of lithium ions. Therefore, when the positive electrode active material 10 is used for a secondary battery, the LWO compound 6 existing on the surface of the primary particles 3 (3a, 3b) of the first composite oxide particles 1 forms the conduction path of Li at the interface between the primary particles 3 (3a, 3b) and the electrolyte solution. This can reduce the reaction resistance of the positive electrode (hereinafter may be referred to as "positive electrode resistance"). When the positive electrode resistance is decreased, the voltage to be lost in the battery is decreased, and the voltage that is eventually applied to the load side becomes relatively high; thus, high output energy can be obtained. Moreover, when the applied voltage to the load side is increased, the intercalation and deintercalation of lithium in the positive electrode becomes sufficient, so that the battery capacity can be improved.

In the case where only the surface of the secondary particles of the lithium nickel composite oxide particle is covered with a layered substance similarly to the case of the conventional technique, the specific surface area becomes smaller regardless of the thickness of the covering. Therefore, even if the covering substance has high lithium ion conductivity, the contact area with the electrolyte solution becomes small. In the case where only the surface of the secondary particles is provided with the layered substance, the formation of the compound (layered substance) tends to concentrate on the surface of a particular secondary particle. Therefore, since the covering layered substance has high lithium ion conductivity, the effects of higher charging-discharging capacity and lower reaction resistance can be obtained but the effects are not sufficient and there is room for improvement.

On the other hand, when the positive electrode active material 10 is used for a secondary battery, the contact between the first composite oxide particles 1 and the electrolyte solution occurs on the surface of the primary particles 3. Here, the surface of the primary particles 3 corresponds to the surface part of the primary particles 3 where the electrolyte solution can be in contact, and for example, includes the surface of the primary particles exposed at the outer surface of the secondary particle (for example, the primary particles 3a) and the surface of the primary particles (for example, the primary particles 3b) existing near the surface of the secondary particle or exposed to the internal space to which the electrolyte solution can permeate from the outside of the secondary particle 4. Furthermore, the surface of the primary particles 3 includes the grain boundary between the primary particles where the bonding between the primary particles is imperfect and the electrolyte solution can permeate.

As described above, when the positive electrode active material 10 is used for the secondary battery, the contact between the first composite oxide particle 1 and the electrolyte solution occurs not only on the outer surface of the secondary particle 4 formed by the aggregation of the primary particles 3 but also near the surface of the secondary particle, in the space inside the secondary particle, or at the imperfect grain boundary. In view of this, the LWO compound 6 is formed also on the surface of the primary particles 3 (3a, 3b), so that the transfer of lithium ions can be facilitated further. The first composite oxide particle 1 has the LWO compound 6 not only on the surface of the primary particles 3a located on the surface of the secondary particle 4 but also on the surface of the primary particles 3b located inside the secondary particle 4; therefore, the reaction resistance of the lithium nickel composite oxide particle can be reduced further.

Figure 2A:
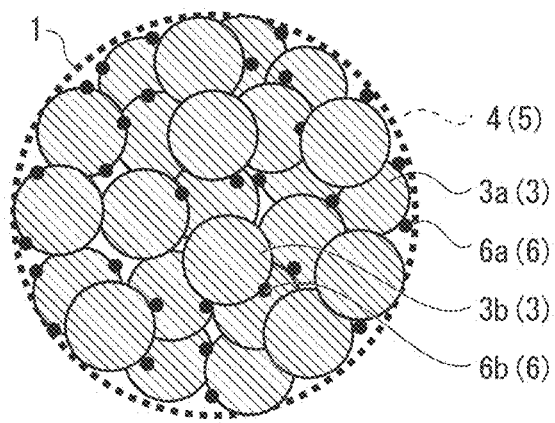
FIGS. 2A to 2C are schematic diagrams each illustrating one example of a first lithium nickel composite oxide.
Figure 2B:
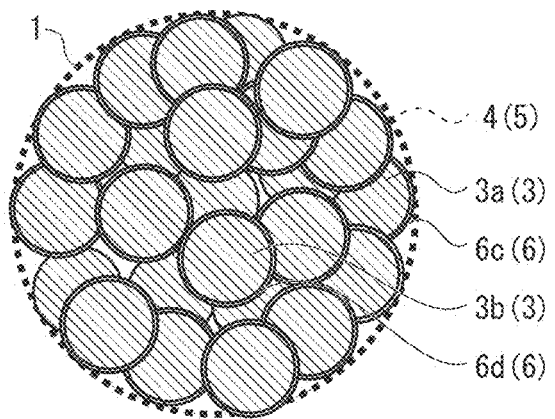
Figure 2C:
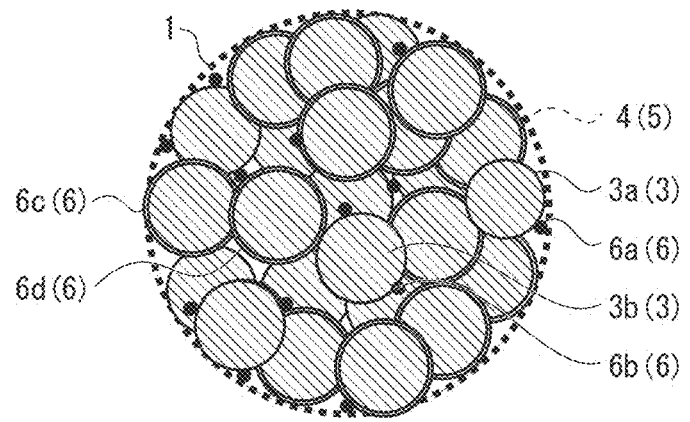
Figure 3:
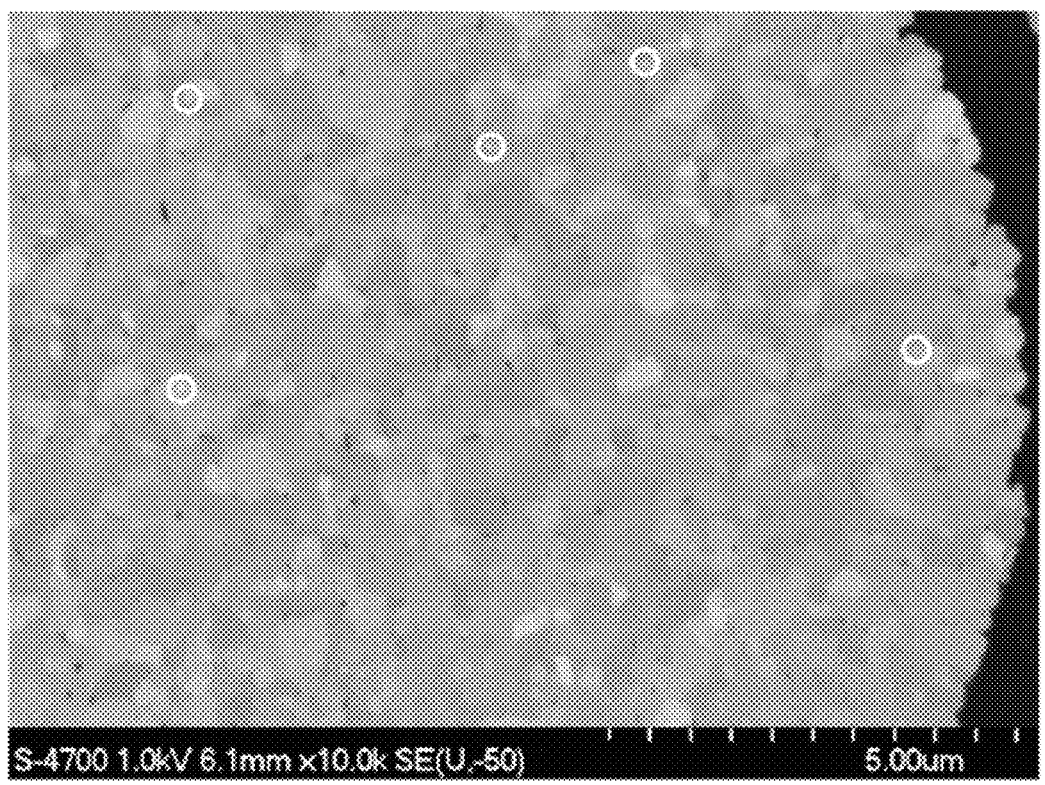
FIG. 3 is a sectional SEM photograph illustrating one example of the first lithium nickel composite oxide (magnification: 10,000) (a circled part corresponds to lithium tungstate).

FIGS. 2A to 2C are schematic diagrams each illustrating one example of the first composite oxide particle 1, and FIG. 3 is a sectional SEM photograph (magnification: 10,000) illustrating one example of the first composite oxide particle 1. The LWO compound 6 contained in the first composite oxide particle 1 is not limited to a particular form as long as the compound 6 exists on the surface of the primary particles 3 (3a, 3b). The LWO compound 6 may exist on the surface of the primary particles 3 (3a, 3b) in the form of microparticles 6a and 6b with a particle diameter of 1 nm or larger and 500 nm or smaller as illustrated in FIG. 2A. Such a form can secure the sufficient contact area with the electrolyte solution and effectively improve lithium ion conductivity. Thus, the charging-discharging capacity can be improved and the positive electrode resistance can be reduced more effectively.

If the LWO compound (microparticles) 6a and 6b has a particle diameter of smaller than 1 nm, the microscopic particles 6a and 6b may fail to have the sufficient lithium ion conductivity. If the particle diameter of the LWO compound (microparticle) 6a and 6b is larger than 500 nm, the formation of the microparticles (LWO compound 6) on the surface of the primary particles 3 (3a, 3b) becomes inhomogeneous and the effect of reducing the reaction resistance may be insufficient. The particle diameter of the LWO compound (microparticles) 6a and 6b is preferably 1 nm or larger and 300 nm or smaller, and more preferably 5 nm or larger and 200 nm or smaller from the viewpoint of distributing the microparticles of the LWO compound 6 homogeneously on the surface of the primary particles 3 (3a, 3b) for the higher effect.

It is not necessary that the LWO compound 6 is formed over the entire surface of the primary particles, and the LWO compound may be scattered. Even when the LWO compound 6 is scattered, the effect of reducing the reaction resistance can be obtained as long as the LWO is formed on the surface of the primary particles exposed to the outer surface and the inside of the lithium nickel composite oxide particle. It is not necessary that the whole LWO compound (microparticles) 6a and 6b has a particle diameter of 1 nm or larger and 500 nm or smaller. A high effect can be obtained when preferably 50% or more of the number of LWO compound (microparticles) 6a and 6b has a particle diameter of 1 nm or larger and 500 nm or smaller.

The LWO compound 6 may exist in the form of covering the surface of the primary particles 3a and 3b with thin films (covering films) 6c and 6d formed of the LWO compound as illustrated in FIG. 2B, for example. In the case of forming such covering films 6c and 6d, the Li conduction path can be formed at the interface with the electrolyte solution while suppressing the decrease in specific surface area; thus, the higher effects of improving the charging-discharging capacity and reducing the reaction resistance can be obtained.

In the case of covering the surface of the primary particles with the films 6c and 6d, it is preferable that the films 6c and 6d exist as films with a thickness of 1 nm or larger and 200 nm or smaller on the surface of the primary particles of the lithium metal composite oxide. For the higher effect, the film thickness is preferably 1 nm or larger and 150 nm or smaller, and more preferably 1 nm or larger and 100 nm or smaller. When the thin films 6c and 6d have a thickness of smaller than 1 nm, the films may fail to have the sufficient lithium ion conductivity. On the other hand, when the thin films 6c and 6d have a thickness of larger than 200 nm, the lithium ion conductivity may decrease and the effect higher than the reaction resistance reducing effect may be unobtainable.

Note that the films 6c and 6d only need to be formed on at least a part of the primary particles 3a and 3b, and for example, may be formed partially on the surface of the primary particles 3a and 3b. It is not necessary that the entire films 6c and 6d have a thickness of 1 nm or larger and 200 nm or smaller. For example, the films 6c and 6d can produce a high effect as long as the films 6c and 6d having the thickness in the above range are formed on at least a part of the surface of the primary particles.

The LWO compound 6 may exist on the surface of the primary particles in a state that both forms of the microparticles 6a and 6b and the films 6c and 6d exist as illustrated in FIG. 2C. In this case, a high effect for a battery characteristic can also be obtained.

The properties of the surface of the primary particle 3 (3a, 3b) of the first composite oxide particle 1 can be determined by the observation with a field emission type scanning electron microscope or a transmission electron microscope. In the positive electrode active material for a nonaqueous electrolyte secondary battery according to the present invention, for example, it has been demonstrated that lithium tungstate is formed on the surface of the primary particle of the first composite oxide particle 1 as illustrated in FIG. 3.

The LWO compound 6 is not limited to the compound where W and Li are in the form of lithium tungstate, and refers to any compound containing W and Li. The LWO compound 6 is, for example, preferably at least one kind selected from $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$, and hydrates thereof. In the case of such lithium tungstate, lithium ion conductivity is further increased, so that the effect of reducing the reaction resistance is improved further.

The amount of tungsten contained in the LWO compound 6 is preferably 0.05 at % or more and 3.0 at % or less, more preferably 0.05 at % or more and 2.0 at % or less, and much more preferably 0.08 at % or more and 1.0 at % or less relative to the total number of atoms of Ni, Co, and M contained in the first composite oxide particles 1. When the amount of tungsten is in the above range, both the higher charging-discharging capacity and the higher output characteristic can be achieved. The amount of tungsten can be measured by the IPC atomic emission spectrometry (ICP method).

When the amount of tungsten is less than 0.05 at %, the effect of improving the output characteristic may be insufficient. On the other hand, when the amount of tungsten is more than 3.0 at %, the compound is formed excessively, resulting in that lithium conduction between the lithium nickel composite oxide and the electrolyte solution may be impaired and the charging-discharging capacity may deteriorate.

As illustrated in FIG. 1A, the second composite oxide particle 2 has a composition represented by $Li_{z2}Ni_{1-x2-y2}Co_{x2}M^2_{y2}O_2$ (where $0 \leq x2 \leq 0.35$, $0 \leq y2 \leq 0.35$, $0.95 \leq z2 \leq 1.15$, and $M^2$ is at least one element selected from Mn, V, Mg, Mo, Nb, Ti, and Al), includes secondary particles 8 each corresponding to an aggregation of a plurality of primary particles 7, and does not contain lithium tungstate. As illustrated in FIG. 1B, for example, the positive electrode active material 10 can be obtained by mixing the first composite oxide particles 1 and the second composite oxide particles 2. In the case of mixing the first composite oxide particles 1 and the second composite oxide particles 2, using the positive electrode active material 10 for the positive electrode of a secondary battery can achieve higher output energy and higher battery capacity.

If a battery characteristic is inhomogeneous between the composite oxide particles included in the positive electrode active material, generally, it is likely that a particular particle is burdened so that the cycle characteristic deteriorates or the reaction resistance increases. Moreover, if the lithium nickel composite oxide particles containing tungsten like the first composite oxide particles 1 is contained less, it is disadvantageous in the improvement in battery characteristics.

However, examinations by the present inventor have revealed that if the first composite oxide particle 1 containing the LWO compound and the composite oxide 2 not containing the LWO compound are mixed, 1) a battery characteristic such as an output characteristic or battery capacity does not deteriorate or even if such deterioration occurs, the deterioration is very small, as compared to the case in which the first composite oxide particle 1 containing tungsten is used alone as the positive electrode active material; and (2) a battery characteristic can be improved as compared to the case in which the second composite oxide particle 2 not containing the LWO compound on the surface of the primary particle 7 is used alone.

Such a battery characteristic can be improved by mixing the first composite oxide particles 1 but in order to make this effect more sufficient, the lower limit of the amount of first composite oxide particles 1 to be mixed in the positive electrode active material 10 is preferably 10% by mass or more, and more preferably 20% by mass or more relative to the positive electrode active material 10.

On the other hand, the upper limit of the amount of the first composite oxide particles 1 is preferably 70% by mass or less, more preferably 60% by mass or less, and much more preferably 50% by mass or less relative to the positive electrode active material 10 from the viewpoint of reducing the use amount of tungsten. When the first composite oxide particles 1 are contained more in the positive electrode active material 10, a battery characteristic becomes as high as that would be achieved when the first composite oxide particles 1 are used alone; however, from the viewpoint of reducing the use amount of tungsten, the amount of first composite oxide particles 1 is preferably smaller within a range in which a higher battery characteristic can be achieved.

The amount of tungsten contained in the first composite oxide particles 1 (lithium tungstate) is preferably 0.03 at % or more and 2.5 at % or less, more preferably 0.05 at % or more and 1.5 at % or less, and much more preferably 0.05 at % or more and 1.0 at % or less relative to the total number of atoms of Ni, Co, and M contained in the positive electrode active material 10. The amount of tungsten corresponds to the indicator of the existing amount of lithium tungstate 6 because the positive electrode active material 10 improves the battery characteristic by the lithium tungstate 6. When the amount of tungsten is in the above range, using the positive electrode active material 10 for the battery can achieve the sufficient battery characteristic.

In the positive electrode active material 10, the amount of lithium contained in the lithium compound other than the lithium tungstate on the surface of the primary particles of the first composite oxide particles 1 and the second composite oxide particles 2 (hereinafter referred to as "excess lithium amount") is preferably 0.05% by mass or less, and more preferably 0.03% by mass or less relative to the total amount of the positive electrode active material 10. By limiting the excess lithium amount to the above range, higher charging-discharging capacity and higher output characteristic can be obtained and moreover, a cycle characteristic can be improved.

The lithium compound is a compound containing lithium other than lithium tungstate existing on the surface of the primary particles 3 and 7. Examples of the lithium compound include lithium hydroxide and lithium carbonate. These lithium compounds do not conduct lithium well and may impede the transfer of lithium ions from the lithium nickel composite oxide (including the first composite oxide particles 1 and the second composite oxide particles 2). The amount of lithium contained in these lithium compounds can be expressed as the excess lithium amount.

By reducing the excess lithium amount in the positive electrode active material 10, the effect of promoting the transfer of lithium ions by the lithium tungstate 6 is increased and the burden on the lithium nickel composite oxide in the charging and discharging is reduced so that the output characteristic is improved further; thus, the cycle characteristic can be improved further. By controlling the excess lithium amount in the positive electrode active material 10 to be in the above range, the transfer of lithium ions between the lithium nickel composite oxide particles (including the first composite oxide particles 1 and the second composite oxide particles 2) is homogenized and the burden applied on the particular lithium nickel composite oxide particle is reduced; thus, the aforementioned effect can be increased.

The lower limit of the excess lithium amount is not limited to a particular value and is preferably 0.01% by mass or more from the viewpoint of suppressing the deterioration in battery characteristic. When the excess lithium amount is too small, lithium is extracted excessively from the crystals of the lithium nickel composite oxide particles and in this case a battery characteristic easily deteriorates. Note that the excess lithium amount can be calculated by adding pure water to the positive electrode active material, stirring the mixture for a certain period, filtering the mixture, adding a hydrochloric acid to the filtrate while the pH is measured, and analyzing the state of the lithium compound that is eluted starting from the point of neutralization.

The positive electrode active material 10 contains sulfate radicals (sulfate group) by preferably 0.05% by mass or less, more preferably 0.025% by mass or less, and much more preferably 0.020% by mass or less. If the battery is formed using the positive electrode active material 10 containing the sulfate group by more than 0.05% by mass, the battery is forced to contain the negative electrode material additionally by the amount corresponding to the irreversible capacity of the positive electrode active material. As a result, the capacity per weight and per volume as the entire battery becomes smaller and moreover, extra lithium accumulated in the negative electrode as the irreversible capacity leads to a problem in terms of safety, which is not preferable. The lower limit of the content of sulfate radicals in the positive electrode active material 10 is not limited to a particular value and may be 0.001% by mass or more. The content of sulfate radicals can be obtained by converting the amount of measured S (sulfur) into the amount of sulfate radicals ($SO_4$) by the IPC atomic emission spectrometry (ICP method).

In regard to the amount of lithium in the entire positive electrode active material 10 (including the first composite oxide particles 1 and the second composite oxide particles 2), a ratio of the number of lithium atoms to the total number of atoms of Ni, Co, and M in the positive electrode active material (Me), (Li/Me), is preferably in the range of 0.95 or higher and 1.20 or lower, and more preferably in the range of 0.97 or higher and 1.15 or lower. If the Li/Me is lower than 0.95, the reaction resistance of the positive electrode in the nonaqueous electrolyte secondary battery including the obtained positive electrode active material becomes high; therefore, the output energy of the battery decreases. On the other hand, if Li/Me is higher than 1.20, the initial discharging capacity of the positive electrode active material decreases and additionally, the reaction resistance of the positive electrode increases. Li/Me can be measured by the IPC atomic emission spectrometry (ICP method).

The composition of the lithium nickel composite oxide particles as the core material 5 of the first composite oxide particle 1 is represented by $Li_{z1}Ni_{1-x1-y1}Co_{x1}M^1_{y1}O_2$ (where $0 \leq x1 \leq 0.35$, $0 \leq y1 \leq 0.35$, $0.95 \leq z1 \leq 1.15$, and $M^1$ is at least one element selected from Mn, V, Mg, Mo, Nb, Ti, and Al). Li/Me of the core material 5 is more preferably 0.95 or higher and 1.15 or lower, and much more preferably 0.95 or higher and 1.10 or lower.

In the positive electrode active material 10, the lithium tungstate 6a and 6b is formed on the surface of the primary particles 3a and 3b of the first composite oxide particles 1, and thus the output characteristic and the cycle characteristic are improved. The powder characteristics such as the particle diameter and the tap density as the positive electrode active material are in the ranges of the positive electrode active material generally used.

The effect obtained by providing the lithium tungstate on the surface of the primary particles of the lithium nickel composite oxide particles is applicable to, for example, not only powder of lithium cobalt composite oxide, lithium manganese composite oxide, lithium nickel cobalt manganese oxide, or the like or the positive electrode active material described in the present invention but also positive electrode active materials for a lithium secondary battery that are generally used.

(2) Method for Producing Positive Electrode Active Material for Nonaqueous Electrolyte Secondary Battery As illustrated in FIG. 1B, a method for producing the positive electrode active material 10 includes mixing the first lithium nickel composite oxide particles (first composite oxide particles) 1 containing the lithium tungstate (LWO compound) 6, and the second lithium nickel composite oxide particles (second composite oxide particles) 2 not containing the LWO compound 6. FIG. 4 is a set of diagrams each illustrating an example of a method for producing the first composite oxide particles 1, and when the method for producing the first composite oxide particles 1 is described, FIGS. 5A to 5C are referred to as necessary. The following is the description of one example of the producing method and does not limit the producing method.

The first composite oxide particle 1 has a composition represented by $Li_{z1}Ni_{1-x1-y1}Co_{x1}M^1_{y1}O_2$ (where $0 \le x1 \le 0.35$, $0 \le y1 \le 0.35$, $0.95 \le z1 \le 1.15$, and $M^1$ is at least one element selected from Mn, V, Mg, Mo, Nb, Ti, and Al). The first composite oxide particle 1 includes the core material 5 including the secondary particle corresponding to an aggregation of a plurality of primary particles, and the LWO compound 6 existing on at least a part of the surface of the primary particles 3 on the surface of and inside the first composite oxide particles 1 (core material). A method for producing the first composite oxide particles 1 only needs to enable the lithium tungstate to exist on a surface of the primary particles 3, and may be a conventionally known method. With reference to FIGS. 4A and 4B, and FIGS. 54A to 5C, one example of the method for producing the first composite oxide particles 1 is described.

Figure 4A:
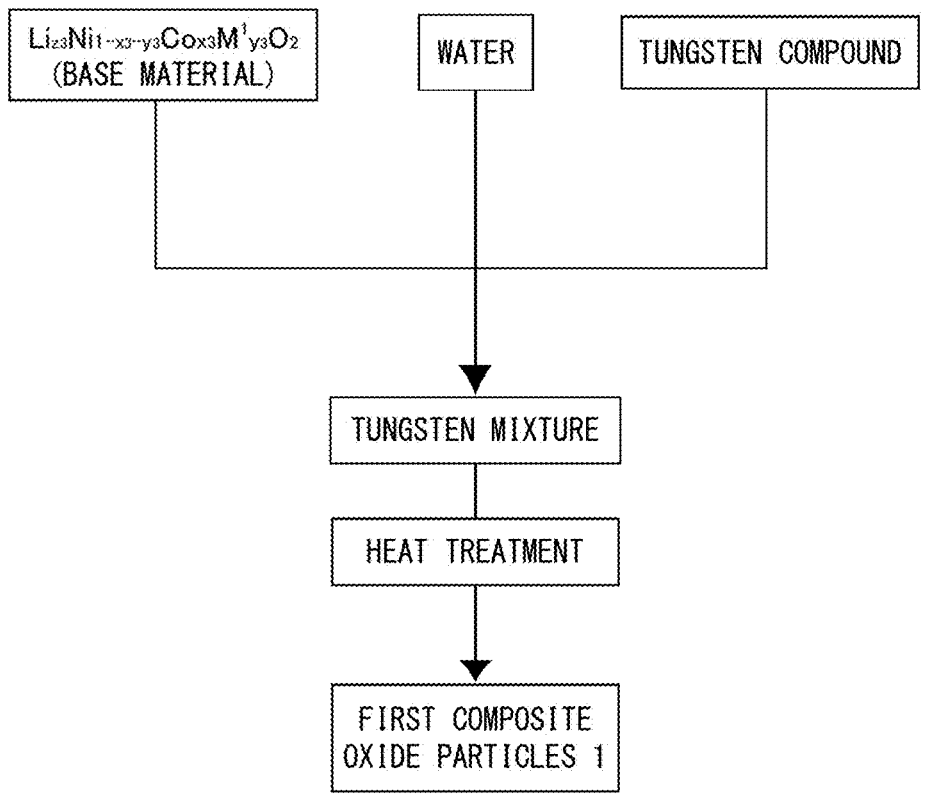
FIGS. 4A and 4B are diagrams each illustrating one example of a method for producing the first lithium nickel composite oxide.
Figure 5A:
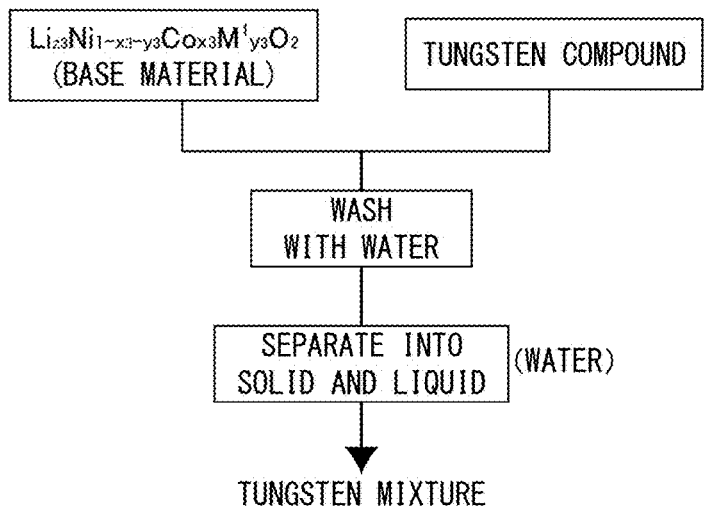
FIGS. 5A to 5C are diagrams each illustrating one example of a method for producing a tungsten mixture.
Figure 5B:
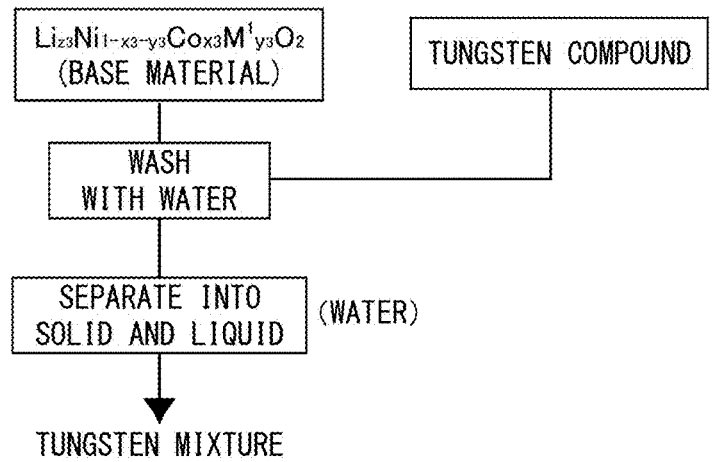
Figure 5C:
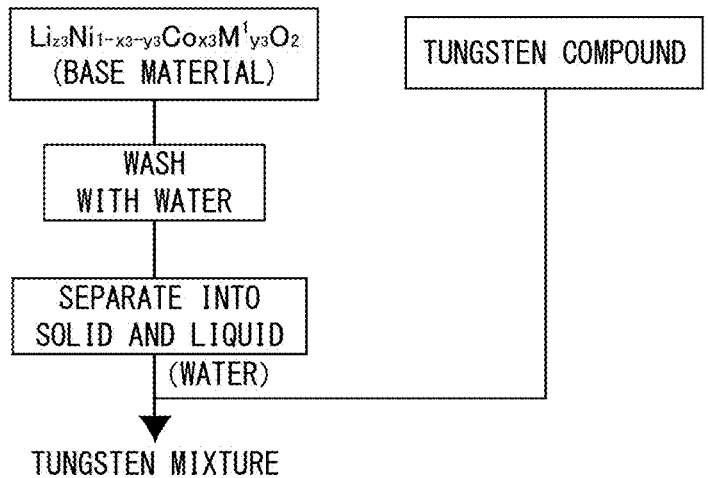

In the production of the first composite oxide particles 1, as illustrated in FIG. 4A, first, a tungsten mixture is prepared. This tungsten mixture contains: a tungsten covered base material (hereinafter also simply called "base material") whose composition is represented by $Li_{z3}Ni_{1-x3-y3}Co_{x3}M^1_{y3}O_2$ (where $0.00 \le x3 \le 0.35$, $0.00 \le y3 \le 0.35$, $0.95 \le z3 \le 1.20$, and $M^1$ is at least one element selected from Mn, V, Mg, Mo, Nb, Ti, and Al) and that includes secondary particle corresponding to an aggregation of a plurality of primary particles; water of 2% by mass or more relative to the total amount of the base material; and a tungsten compound. From the viewpoint of higher capacity and higher safety, it is preferable to satisfy $0.01 \le x3 \le 0.10$, $0.01 \le y3 \le 0.05$, and $0.97 \le z3 \le 1.05$.

The tungsten mixture contains water of 2% by mass or more relative to the total amount of the base material. This enables the tungsten in the tungsten compound to permeate together with water into the space between the primary particles communicating with the outside of the secondary particles (base material) or to the boundary between the incomplete primary particles, and thus a sufficient amount of tungsten can be diffused to the surface of the primary particles. The upper limit of the amount of water is not restricted in particular and may be, for example, 20% by mass or less. If the amount of water is excessive, the efficiency of the heat treatment in a later step may decrease or more lithium may be eluted from the lithium metal composite oxide particles (base material) so that the molar ratio of eluted lithium in the tungsten mixture becomes too high. In this case, if the positive electrode active material to be obtained is used for the positive electrode of the battery, a battery characteristic may deteriorate.

The amount of water relative to the total amount of the base material is preferably 2% by mass or more and 20% by mass or less, more preferably 3% by mass or more and 15% by mass or less, and much more preferably 3% by mass or more and 10% by mass or less. When the amount of water is in the above range, the pH is increased by the amount of lithium eluted into water and thus, the excess elution of lithium is suppressed. The amount of water in the tungsten mixture can be controlled easily to be in the aforementioned range by washing the base material with water and separating the mixture into a solid and a liquid as described below. Note that the molar ratio among Ni, Co, and $M^1$ in the base material powder is retained until the first composite oxide particles 1 (core material 5) is formed.

The tungsten compound is a compound containing tungsten (W) and preferably has the water solubility of such a degree that the compound is dissolved in water contained in the tungsten mixture. If the tungsten compound is soluble to water, tungsten (W) can be permeated sufficiently to the surface of the primary particles inside the secondary particle (base material). The tungsten compound may be, for example, either in the solid state or in the state of an aqueous solution. When the tungsten compound is in the state of an aqueous solution, the amount of tungsten compound (aqueous solution) only needs to be the amount by which the solution can permeate to the surface of the primary particles inside the secondary particle (base material), and a part of the aqueous solution may contain the solid state. The tungsten compound that is not dissolved easily in water at room temperature can also be used as long as the tungsten compound can be dissolved in water at the increased temperature by the heat treatment. The water in the tungsten mixture becomes alkali by the lithium contained in the base material and therefore, the tungsten compound may be the compound that can be dissolved in the alkali.

The tungsten compound may be any compound that can be dissolved in water without particular limitation, and may be, for example, tungsten oxide, tungstic acid, lithium tungstate, ammonium tungstate, sodium tungstate, or the like. Among these, tungsten oxide, tungsten acid, lithium tungstate, and ammonium tungstate are preferable, and tungsten oxide ($WO_3$), tungstic acid ($WO_3 \cdot H_2O$), and lithium tungstate ($Li_2WO_4$, $Li_4WO_5$, $Li_6W_2O_9$) are more preferable because a possibility of the impurity mixing is low. One kind of those tungsten compounds may be used alone, or two or more kinds thereof may be used in combination.

In regard to the molar ratio of the total amount of lithium (Li) contained in the water and the tungsten compound or in the water, the tungsten compound, and the lithium compound relative to the amount of tungsten (W) contained in the tungsten mixture (hereinafter referred to as "Li molar ratio"), the upper limit is preferably 5.0 or lower, more preferably lower than 4.5, and much more preferably 4.0 or lower. When the upper limit of the Li molar ratio is in the above range, the excess lithium amount of the first composite oxide particles can be decreased so that the output characteristic can be improved, and that the cycle characteristic can be improved.

On the other hand, the lower limit of the Li molar ratio is preferably 0.5 or higher, more preferably 1.0 or higher, and much more preferably 1.5 or higher. Lithium calculated as the Li molar ratio in the tungsten mixture forms lithium tungstate together with tungsten (W) derived from the tungsten compound in the later heat treatment. At least a part of lithium can be the lithium derived from the base material. In the case where the lower limit of the Li molar ratio is lower than 0.5, if the Li molar ratio becomes lower than 0.5, lithium is excessively extracted from the base material, such excess lithium forms lithium tungstate, and therefore, the battery characteristic of the first composite oxide particles may deteriorate.

The amount of tungsten contained in the tungsten mixture is preferably 0.05 at % or more and 3.0 at % or less, more preferably 0.05 at % or more and 2.0 at % or less, and much more preferably 0.08 at % or more and 1.0 at % or less relative to the total number of atoms of Ni, Co, and M contained in the base material. When the amount of tungsten is in the above range, the amount of tungsten contained in the lithium tungstate in the first composite oxide particles 1 can be made in the preferable range, and when the positive electrode active material 1 is used for the secondary battery, both higher charging-discharging capacity and a high output characteristic can be achieved at higher level.

Note that when the tungsten mixture is prepared, water is supplied and mixed together with the tungsten compound so that the tungsten compound contains water by 2% by mass or more, or that the aqueous solution of the tungsten compound or the tungsten compound, and water may be supplied individually.

Figure 4B:
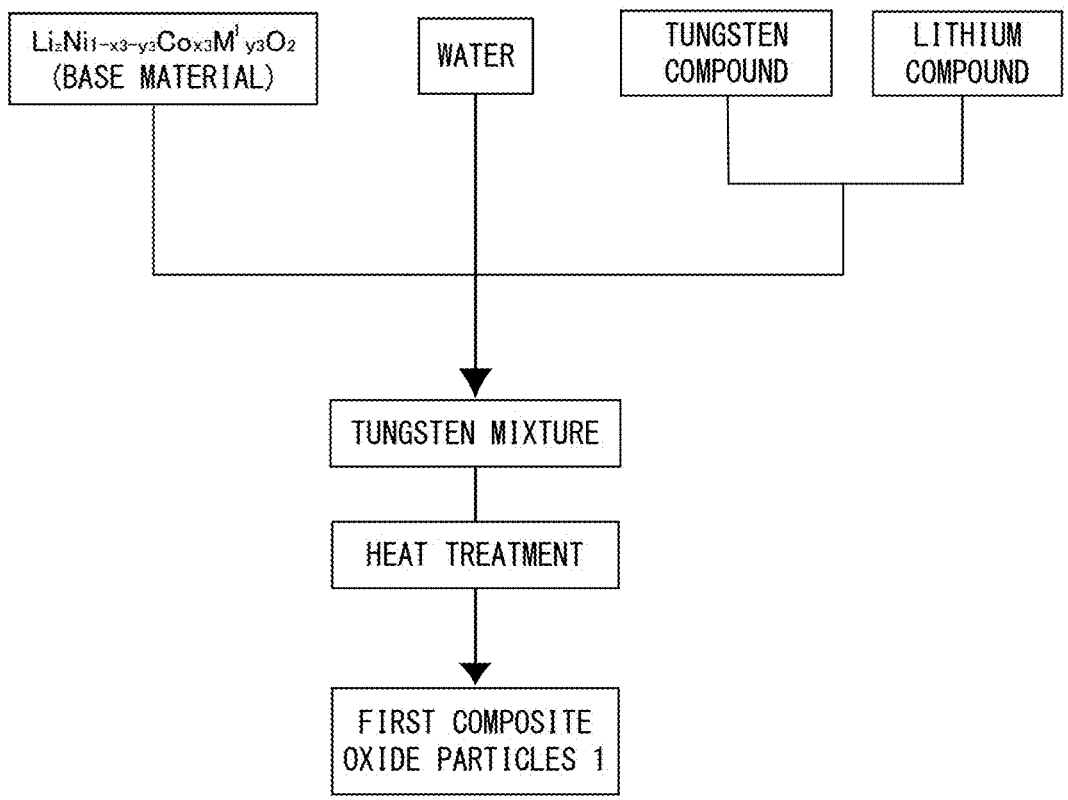

Note that a lithium source that forms lithium tungstate may be, for example, lithium derived from the tungsten compound such as lithium tungstate or lithium derived from the base material ($Li_{z3}Ni_{1-x3-y3}Co_{x3}M^1_{y3}O_2$ or excess lithium). As illustrated in FIG. 4B, the tungsten mixture may contain a lithium compound not containing tungsten, in addition to the base material, water, and the tungsten compound. This lithium compound can be used as the lithium source for forming lithium tungstate. The lithium compound not containing tungsten may be a water-soluble compound such as lithium hydroxide.

FIGS. 5A to 5C are diagrams each illustrating one example of a method for preparing the tungsten mixture obtained in the process for producing the first composite oxide particles 1. As illustrated in FIGS. 5A to 5C, the lithium nickel composite oxide particles serving as the base material may be washed with water before the tungsten mixture is prepared. The washing with water can be performed by mixing the base material and water to make the mixture into slurry. Washing the base material with water can eliminate the unreacted lithium compound and the impurity elements such as sulfate radicals that excessively exist and deteriorate a battery characteristic. The unreacted lithium compound corresponds to lithium hydroxide, lithium carbonate, or the like.

In the case of washing the base material with water, the water in the tungsten mixture contains less lithium and the upper limit of the Li molar ratio can be controlled easily. Normally, metal composite hydroxide or lithium metal composite oxide obtained by firing a metal composite oxide and a lithium compound contains an unreacted lithium compound in/on secondary particles or on a surface of primary particles. Lithium (Li) derived from the unreacted lithium compound contained in the base material is eluted into the added water when the tungsten mixture is prepared. If too much lithium is eluted into the water, it may be difficult to control the upper limit of the Li molar ratio to be within the above range.

The base material washed with water may be separated into the solid and the liquid after the washing in order to adjust the water content. By separating the base material into the solid and the liquid, it becomes easy to control the amount of water to be contained in the tungsten mixture.

The condition of water-washing the base material by making the base material into slurry is not limited to a particular condition as long as the unreacted lithium compound can be reduced sufficiently. The amount of unreacted lithium compound contained in the water-washed base material is, for example, 0.08% by mass or less, preferably 0.05% by mass or less, relative to the total amount of the base material. Note that the amount of unreacted lithium compound contained in the base material can be measured by the method similar to the method for measuring the excess lithium in the positive electrode active material 1.

The water-washing by making the mixture into slurry is performed by, for example, mixing the base material powder and water and then stirring the mixture. The concentration of the base material powder contained in the slurry is, for example, 200 g or more and 5,000 g or less relative to 1 L of water. When the concentration of the base material powder is in this range, the unreacted lithium compound can be reduced more sufficiently while the deterioration due to the elution of lithium from the base material is suppressed.

The water-washing time is, for example, about 5 minutes or longer and 60 minute or shorter. When the water-washing time is in this range, the amount of unreacted lithium compound contained in the base material can be reduced sufficiently. The water-washing temperature is in the range of 10° C. or higher and 40° C. or lower. When the water-washing temperature is in this range, the amount of unreacted lithium compound contained in the base material can be reduced sufficiently.

In the case of water-washing the base material, adding the tungsten compound is not limited to a particular procedure as long as the tungsten compound as above can be obtained. For example, as illustrated in FIG. 5A, after the base material and the tungsten compound are mixed to prepare the tungsten mixture, the tungsten mixture (including the base material) can be washed with water. In this case, since the tungsten compound is washed away with water, the tungsten in the tungsten mixture may become insufficient. Therefore, for example, as illustrated in FIGS. 5B and 5C, the tungsten mixture is obtained preferably by adding the tungsten compound in at least one of the following timing: in the step of water-washing the base material; and after the step of separating the mixture into the solid and the liquid.

If the tungsten compound is added in the water-washing step, the tungsten compound may be added to the water to be mixed with the base material (powder) in advance to produce an aqueous solution or suspension; alternatively, after the base material and water are mixed to produce slurry, the tungsten compound may be added to the slurry.

As illustrated in FIG. 5B, in the case of adding the tungsten compound when the base material is washed with water, the tungsten compound is preferably a compound that is totally dissolved in the slurry in the water-washing or a compound not containing lithium. The tungsten compound containing lithium that is dissolved in slurry is, for example, lithium tungstate ($Li_2WO_4$, $Li_4WO_5$, $Li_6W_2O_9$), and the tungsten compound not containing lithium is, for example, tungsten oxide ($WO_3$) or tungstic acid ($WO_3.H_2O$). By using these tungsten compounds, the amount of lithium in the tungsten mixture can be controlled easily without an influence from the amount of lithium contained in the tungsten compound of the solid component in the tungsten mixture.

As illustrated in FIG. 5C, in the case of adding the tungsten compound after the separation into the solid and the liquid, there is no lithium or tungsten removed with water in the solid-liquid separation and the tungsten compound totally remains in the mixture; thus, the control over the Li molar ratio is facilitated. In this case, the tungsten compound may be either in the state of the aqueous solution or in the powder state.

In the case of adding the tungsten compound in the step of water-washing, the tungsten compound may be either in the state of an aqueous solution or in a powder state. By adding the tungsten compound to the slurry and stirring the mixture, a uniform mixture can be obtained.

If the tungsten compound is in the state of an aqueous solution or a water-soluble compound, a large part of the tungsten compound dissolved in the slurry in the step of separating the mixture into the solid and the liquid after the water-washing is removed together with the liquid component of the slurry. However, because of the presence of the tungsten dissolved in the water of the tungsten mixture, the tungsten mixture can contain a sufficient amount of tungsten. The amount of tungsten in the tungsten mixture and additionally the amount of water therein become stable by the water-washing condition and the solid-liquid separation step; therefore, these conditions and moreover the kind of tungsten compound and the amount thereof to be added can be determined by a preliminary test. The total amount of lithium (hereinafter referred to as the total lithium amount) contained in the tungsten compound and the water corresponding to the tungsten in the tungsten mixture can be determined by a preliminary test, which is similar to the procedure for obtaining the amount of tungsten.

The amount of tungsten in the mixture when the tungsten compound is added in the water-washing step can be obtained by the ICP atomic emission spectrometry. The amount of lithium contained in the water in the mixture can be obtained from the amount of water and a lithium analysis value obtained by the ICP atomic emission spectrometry in the liquid component separated from the solid after the water-washing.

Note that the amount of lithium contained in the tungsten compound of the solid component included in the tungsten mixture can be obtained by adding the tungsten compound in a lithium hydroxide aqueous solution with the same concentration as the liquid component after the water-washing, stirring the mixture under the same condition as that at the water-washing, and calculating the amount of solid component remaining in the tungsten mixture from the ratio of the tungsten compound remaining as residue, and thus, the amount of lithium can be obtained from the tungsten compound remaining as the solid component.

The amount of tungsten in the mixture when the tungsten compound is added after the solid-liquid separation step can be obtained from the amount of tungsten compound to be added.

On the other hand, the total amount of lithium in the tungsten mixture can be calculated as the total of the amount of lithium in the water obtained from the water content and the analysis value of lithium obtained by the ICP atomic emission spectrometry in the liquid component separated from the solid after the water-washing, and the amount of lithium obtained from the tungsten compound to be added or the tungsten compound and the lithium compound to be added.

In the case of adding the tungsten compound as the aqueous solution after the solid-liquid separation step, it is necessary to adjust the aqueous solution so that the water content is preferably not more than 20% by mass and that the tungsten concentration is preferably 0.05 mol/L or more and 2 mol/L or less. When the tungsten concentration is in the above range, tungsten can be added in a necessary amount while the amount of water in the tungsten mixture is reduced. When the water content is more than 20% by mass, the water may be adjusted by the solid-liquid separation again but in this case, it is necessary to confirm the Li molar ratio of the mixture by obtaining the amount of tungsten and lithium in the liquid component that has been removed.

In order to make the tungsten mixture contain water by 2% by mass or more, the mixing after the solid-liquid separation is preferably performed at 50° C. or lower. If the temperature is higher than 50° C., the water content may become less than 2% by mass because of the drying in the mixing process.

The mixing with the tungsten compound is not particularly limited as long as an apparatus capable of uniform mixing is used, and a conventional mixer can be used. For example, the mixing with the tungsten compound is performed sufficiently using a shaker mixer, a Loedige mixer, a Julia mixer, a V blender, or the like to such a degree that the form of the lithium metal composite oxide particles is not destroyed.

Components of the first composite oxide particles 1 include the composite oxide particles as the base material, tungsten that is increased by the addition in the preparation step, and lithium added as necessary. Therefore, the base material is preferably lithium metal composite oxide represented by general formula $Li_zNi_{1-x-y}Co_xM_yO_2$ (where $0<x\leq0.35$, $0\leq y\leq0.35$, $0.95\leq z\leq1.20$, and M is at least one element selected from Mn, V, Mg, Mo, Nb, Ti, and Al) from the viewpoints of high capacity and low reaction resistance.

On the other hand, in the case of water-washing the base material, the Li/Me (corresponding to z in the general formula) of the base material decreases due to the elution of lithium in the water-washing. Therefore, the amount of decrease is obtained in advance by performing a preliminary test, and the base material with the adjusted Li/Me can be used as the material before the water-washing. The amount of decrease of Li/Me by the general water-washing condition is about 0.03 to 0.08. When the water is supplied in the mixing step, lithium is eluted though in a small amount. Therefore, in the case of performing the water-washing, z expressing the Li/Me of the base material before the water-washing satisfies preferably $0.95\leq z\leq1.20$, and more preferably $0.97\leq z\leq1.15$.

Increasing the contact area with the electrolyte solution is advantageous in improving the output characteristic; therefore, it is preferable to use lithium metal composite oxide powder that includes primary particles and secondary particles each corresponding to an aggregation of the primary particles, the secondary particle having a space and a grain boundary to which the electrolyte solution can permeate.

When the base material and the tungsten compound are mixed or the base material, the tungsten compound and the lithium compound are mixed, a conventional mixer can be used. For example, a shaker mixer, a Loedige mixer, a Julia mixer, a V blender, an air blender, or the like may be used to perform the mixing sufficiently to such a degree that the form of the tungsten covered base material is not destroyed. Note that when excess lithium contained in the base material adsorbs carbon dioxide, the lithium becomes lithium carbonate, causing gas generation; therefore, in the mixing atmosphere, the carbon dioxide concentration is preferably 0 to 100 ppm.

Next, as illustrated in FIGS. 4A and 4B, heat treatment is performed on the tungsten mixture obtained as above. By the heat treatment, tungsten and lithium contained in the water of the tungsten mixture react with each other and lithium tungstate (LWO compound) is formed on the surface of the primary particles of the base material (core material); and the first composite oxide particles 1 are obtained.

The heat treatment is not limited to a particular condition as long as the LWO compound 6 is formed on the surface of the primary particles of the base material (core material). In regard to the heat treatment condition, for example, from the viewpoint of preventing the deterioration in electric characteristics when the positive electrode active material 10 is used for a secondary battery, the reaction with carbonate or water in the atmosphere is avoided and the heat treatment can be carried out in the oxidizing atmosphere such as oxygen atmosphere or the vacuum atmosphere.

The heat treatment temperature is preferably 100° C. or higher and 600° C. or lower from the viewpoint of preventing the deterioration in electric characteristic when the positive electrode active material 10 is used for the secondary battery. If the heat treatment temperature is lower than 100° C., the water evaporation is insufficient and the formation of the LWO compound 6 may be insufficient. On the other hand, if the heat treatment temperature is higher than 600° C., the primary particles of the lithium metal composite oxide are sintered and some tungsten is dissolved in the solid state into the layered structure of the lithium metal composite oxide; thus, the battery may have lower charging-discharging capacity.

On the other hand, if the tungsten compound contained in the tungsten mixture remains as a solid substance without being dissolved in water, especially if the tungsten compound is added as powder after the solid-liquid separation step, the temperature-increasing speed is preferably set to 0.8 to 1.2° C./min while the dissolving of this solid substance is performed sufficiently, for example, until the temperature exceeds 90° C. Powder of the tungsten compound is dissolved in the water contained in the mixture also in the process of preparing the tungsten mixture, and by setting such a temperature-increasing temperature, the solid tungsten compound can be dissolved sufficiently while the temperature is increased, so that the tungsten compound can be permeated to the surface of the primary particles inside the secondary particle. In the case where the solid tungsten compound is dissolved, it is preferable to perform the heat treatment in a sealed container so that water is not evaporated until the sufficient dissolving is performed.

The heat treatment is not limited to a particular time but the time is preferably 3 hours or longer and 20 hours or shorter, and more preferably 5 hours or longer and 15 hours or shorter from the viewpoint of forming the LWO compound 6 by evaporating the water in the tungsten mixture sufficiently.

The heat treatment preferably includes: first heat treatment in which the tungsten compound is dissolved by the reaction between the tungsten compound and the lithium compound existing on the surface of the primary particles of the base material so that the tungsten is diffused on the surface of the primary particles; and second heat treatment which is performed at higher temperature than the temperature in the first heat treatment and in which the lithium tungstate compound is formed on the surface of the primary particles of the lithium nickel composite oxide particles.

In the first heat treatment, the tungsten mixture containing the tungsten compound is heated, so that not only lithium eluted in the mixture but also the lithium compound remaining on the surface of the primary particles of the base material reacts with the tungsten compound and is dissolved. This drastically reduces the excess lithium in the tungsten covered composite oxide particles to be obtained and improves a battery characteristic. In addition, the effect of extracting lithium existing excessively in the base material is also obtained. The extracted lithium reacts with the tungsten compound and this contributes to higher crystallinity when the tungsten covered composite oxide particles are formed. Thus, the battery characteristic can be improved further. With the first heat treatment, tungsten is dissolved sufficiently in the water in the tungsten mixture, and permeates into the space between the primary particles or the incomplete boundaries in the secondary particle of the base material, and thus tungsten can be diffused to the surface of the primary particles.

In the first heat treatment, the heat treatment temperature is preferably 60 to 80° C. When the heat treatment temperature is in this range, the reaction proceeds sufficiently and water can remain until tungsten permeates, and moreover the lithium compound and the tungsten compound react with each other and tungsten can be sufficiently diffused to the surface of the primary particles. If the first heat temperature is lower than 60° C., the reaction between the tungsten compound and the lithium compound on the surface of the primary particles is insufficient and in this case, it may occur that a necessary amount of lithium tungstate is not synthesized. On the other hand, if the first heat temperature is higher than 80° C., the reaction between the tungsten compound and the lithium compound on the surface of the primary particles and the permeation of tungsten may be insufficient because the evaporation of water is too fast.

The first heat treatment is not limited to a particular time but the time is preferably 0.5 to 2 hours in order to cause the reaction between the lithium compound and the tungsten compound and to allow the tungsten to permeate sufficiently.

The second heat treatment is performed at a higher temperature than that of the first heat treatment, and with the second heat treatment, the water in the mixture is evaporated and the lithium tungstate compound is formed on the surface of the primary particles of the lithium nickel composite oxide particles.

The heat treatment temperature in the second heat treatment is preferably 100° C. or higher and 200° C. or lower. If the heat treatment temperature in the second heat treatment is lower than 100° C., the water evaporation may be insufficient so that the formation of the lithium tungstate compound may be insufficient. On the other hand, if the heat treatment temperature in the second heat treatment is higher than 200° C., the lithium nickel composite oxide particles may cause necking through lithium tungstate or the specific surface area of the lithium nickel composite oxide particles may decrease largely, and in this case, the battery characteristic deteriorates.

The second heat treatment time is not limited to a particular time but the time is preferably 1 to 15 hours, preferably 5 to 12 hours in order to evaporate the water sufficiently and to form the lithium tungstate compound.

In the heat treatment (including the first heat treatment and the second heat treatment), the atmosphere is preferably decarbonated air, inert gas, or vacuum atmosphere in order to avoid reaction between carbonate or water in the atmosphere and lithium on the surface of the lithium nickel composite oxide particles.

Next, as illustrated in FIG. 1B, the positive electrode active material 10 is obtained by mixing the first composite oxide particles 1 obtained by the above method and a second composite oxide 2. A method for producing the second composite oxide 2 is not limited to a particular method and a conventionally known method for producing lithium nickel composite oxide particles can be used.

The second composite oxide particles 2 are preferably washed with water before mixing. The water-washing condition can be a condition similar to the condition for water-washing the base material of the first composite oxide particles 1 described above. In the case of water-washing the second composite oxide particles, unreacted lithium compounds such as excess lithium hydroxide or lithium carbonate, sulfate radicals, or other impurity elements that would deteriorate a battery characteristic can be removed.

In regard to the mixing ratio between the first composite oxide particles 1 and the second composite oxide particles 2, the amount of first composite oxide particles 1 to be mixed with the second composite oxide particles 2 is preferably 10% by mass or more relative to the positive electrode active material 10. In addition, the first composite oxide particles 1 and the second composite oxide particles 2 are mixed so that the amount of tungsten contained in the first composite oxide particles 1 becomes preferably 0.03 to 2.5 at % relative to the total number of atoms of Ni, Co, and M in the positive electrode active material 10. Thus, both higher charging-discharging capacity and a higher output characteristic can be obtained at the same time.

When the first composite oxide particles 1 and the second composite oxide particles 2 are mixed, a conventional mixer can be used. For example, a shaker mixer, a Loedige mixer, a Julia mixer, a V blender, an air blender, or the like may be used to perform the mixing sufficiently to such a degree that the form of the tungsten covered base material is not destroyed.

2. Nonaqueous Electrolyte Secondary Battery

The nonaqueous electrolyte secondary battery according to the present embodiment includes a positive electrode, a negative electrode, a nonaqueous electrolyte solution, and the like, the nonaqueous electrolyte secondary battery including components similar to those of a conventional nonaqueous electrolyte secondary battery. Note that the embodiment described below is just an example and based on the embodiment described herein, the nonaqueous electrolyte secondary battery according to the present invention can be variously changed and modified on the basis of the knowledge of a person skilled in the art. The intended purpose of the nonaqueous electrolyte secondary battery according to the present invention is not limited to a particular purpose.

(a) Positive Electrode

With the use of the positive electrode active material for a nonaqueous electrolyte secondary battery described above, a positive electrode for a nonaqueous electrolyte secondary battery is produced as described below, for example.

First, a positive electrode active material in the powder form, a conductive material, and a binder are mixed, and activated carbon, a solvent for adjusting the viscosity, and the like are added as necessary, and these are kneaded to produce a positive electrode mixture paste.

The mixing ratio in the positive electrode mixture paste is an important element in determining the properties of the nonaqueous electrolyte secondary battery. When the total mass of the solid content of the positive electrode mixture excluding the solvent is 100 parts by mass, it is preferable that the positive electrode active material is contained by 60 to 95 parts by mass, that the conductive material is contained by 1 to 20 parts by mass, and that the binder is contained by 1 to 20 parts by mass, which is similar to the positive electrode of a conventional nonaqueous electrolyte secondary battery.

The obtained positive electrode mixture paste is applied on a surface of a current collector made of an aluminum foil, and then dried so that the solvent is scattered. If necessary, pressure may be applied by roll pressing or the like in order to increase the electrode density. In this manner, a sheet-shaped positive electrode can be produced. The sheet-shaped positive electrode can be, for example, cut into an appropriate size in accordance with the intended battery, so as to be used for the production of the battery. The method for producing the positive electrode is not limited to the described one, and other methods may be used.

In the production of the positive electrode, the conductive material may be, for example, graphite (natural graphite, artificial graphite, expanded graphite, or the like), carbon black materials such as acetylene black or Ketjen black (registered trademark), or the like.

The binder is to bind between the active material particles, and may be, for example, polyvinylidene fluoride (PVDF), polytetrafluoroethylene (PTFE), fluorine rubber, ethylene propylene diene rubber, styrene butadiene rubber, a cellulose resin, a polyacrylic acid, or the like.

If necessary, a solvent that diffuses the positive electrode active material, the conductive material, and activated carbon and dissolves the binding agent is added to the positive electrode mixture. As the solvent, specifically, an organic solvent such as N-methyl-2-pyrrolidone can be used. The activated carbon can be added to the positive electrode mixture in order to increase the electric double layer capacitance.

(b) Negative Electrode

The negative electrode is metal lithium, a lithium alloy, or the like, or can be formed in a manner that: a negative electrode mixture in a paste form is obtained by mixing the binding agent in the negative electrode active material capable of intercalating/deintercalating lithium ions, and adding an appropriate solvent; and the negative electrode mixture is applied on a surface of a metal foil current collector, such as copper, dried and compressed if necessary in order to increase the electrode density.

The negative electrode active material may contain a carbon material, for example, powder of a carbon substance, such as natural graphite, artificial graphite, a fired organic compound such as phenol resin, and coke. In this case, the negative electrode binding agent may be, for example, a fluorine-containing resin such as PVDF, and the solvent that diffuses the active material and the binding agent may be an organic solvent such as N-methyl-2-pyrrolidone, which is similar to the case of the positive electrode.

(c) Separator

A separator is held between the positive electrode and the negative electrode.

The separator is to separate the positive electrode from the negative electrode and hold the electrolyte. A thin film of polyethylene, polypropylene, or the like having a number of microscopic holes can be used as the separator.

(d) Nonaqueous Electrolyte Solution

The nonaqueous electrolyte solution is a solution having lithium salt as the supporting electrolyte dissolved in an organic solvent.

The organic solvent may be formed by single kind or two or more kinds selected from: cyclic carbonates such as ethylene carbonate, propylene carbonate, butylene carbonate, and trifluoropropylene carbonate; chained carbonates such as diethyl carbonate, dimethyl carbonate, ethylmethyl carbonate, and dipropyl carbonate; ether compounds such as tetrahydrofuran, 2-methyltetrahydrofuran, and dimethylethane; sulfur compounds such as ethylmethylsulfone and butanesultone; and phosphorus compounds such as triethyl phosphate and trioctyl phosphate. The supporting electrolyte may be $LiPF_6$, $LiBF_4$, $LiClO_4$, $LiAsF_6$, $LiN(CF_3SO_2)_2$, or the like, or a compound electrolyte thereof.

In addition, the nonaqueous electrolyte solution may contain a radical scavenger, a surfactant, a fire retardant, or the like.

(e) Shape and Structure of Battery

The shape of the nonaqueous electrolyte secondary battery according to the present invention including the positive electrode, the negative electrode, the separator, and the nonaqueous electrolyte solution described above may be a cylindrical type, a stacked type, or other type.

In any shape, the positive electrode and the negative electrode are stacked on each other with the separator interposed therebetween to form an electrode stack, the electrode stack is impregnated with the nonaqueous electrolyte solution, a positive electrode current collector and a positive electrode terminal communicating with the outside are connected with a current collector lead or the like, a negative electrode current collector and a negative electrode terminal communicating with the outside are connected with a current collector lead or the like, these components are sealed in a battery case, and the nonaqueous electrolyte secondary battery is completed.

(f) Characteristics

The nonaqueous electrolyte secondary battery including the positive electrode active material according to the present invention has high capacity and high output energy.

In particular, when the positive electrode active material for a nonaqueous electrolyte secondary battery according to the present invention obtained in a preferred embodiment is used for, for example, a 2032-type coin battery, a high initial discharging capacity of 165 mAh/g or higher and a low positive electrode resistance are obtained and moreover, high capacity and high output energy are obtained. In addition, the thermal stability is high and therefore the safety is high.

One example of a method of measuring the positive electrode resistance in the present invention is as follows.

Figure 6:
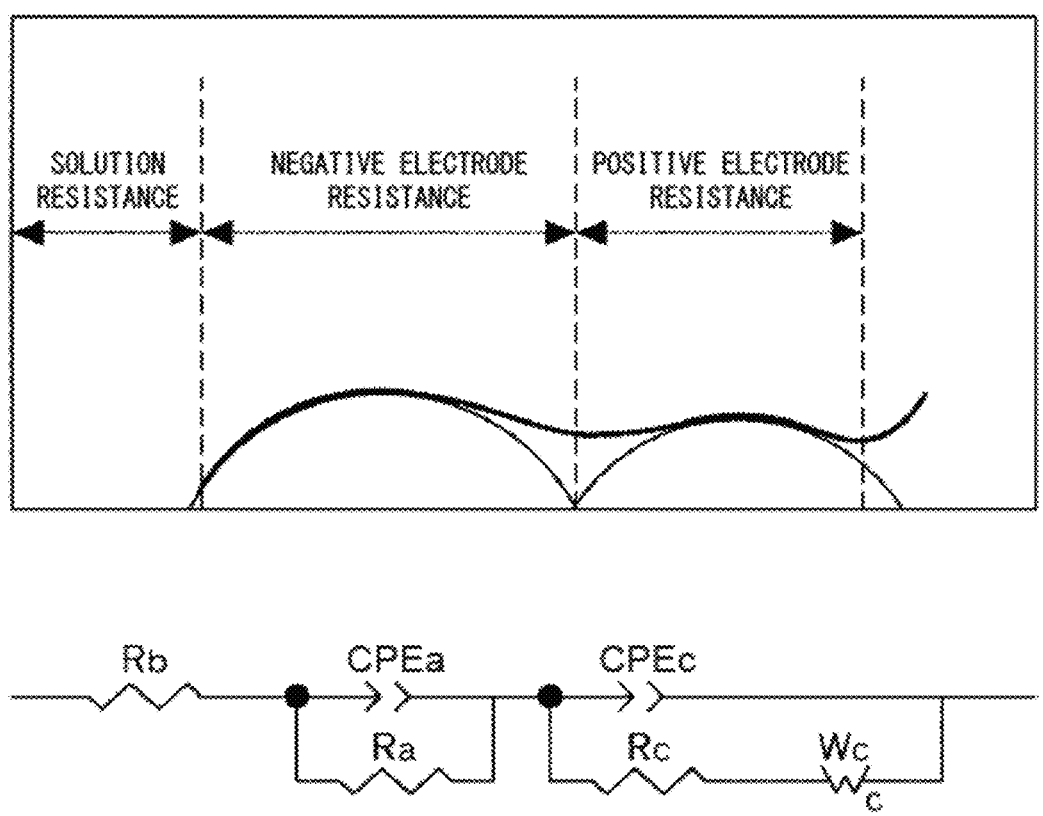
FIG. 6 is a schematic explanatory diagram illustrating a measurement example of an impedance evaluation and an equivalent circuit used in an analysis.

Frequency dependence of the battery reaction is measured by a typical alternating-current impedance method as an electrochemical evaluation method, and then the Nyquist diagram based on the solution resistance, the negative electrode resistance, the negative electrode capacity, the positive electrode resistance, and the positive electrode capacity is obtained as illustrated in FIG. 6.

The battery reaction in the electrode includes the resistance component along with charge transfer and the capacity component by the electric double layer, and in an electric circuit, these are expressed as a parallel circuit including a resistor and a capacitor. The whole battery is expressed as an equivalent circuit in which the solution resistor and the parallel circuit of the negative electrode and the positive electrode are connected in series.

The Nyquist diagram measured using this equivalent circuit is subjected to the fitting calculation and each resistance component and capacity component can be estimated.

The positive electrode resistance is equal to the diameter of a semicircle in the obtained Nyquist diagram on the low-frequency side. Thus, by performing the alternating-current impedance measurement on the obtained positive electrode and the fitting calculation on the obtained Nyquist diagram with the equivalent circuit, the positive electrode resistance can be estimated.

EXAMPLES

The present invention will hereinafter be described in more detail with reference to Examples but the present invention is not limited thereby.

In regard to the secondary battery including the positive electrode containing the positive electrode active material obtained by the present invention, the properties (initial discharging capacity, positive electrode resistance, and cycle characteristic) were measured.

The present invention will hereinafter be described in more detail with reference to Examples but the present invention is not limited thereby.

(Production and Evaluation of Battery)

Figure 7:
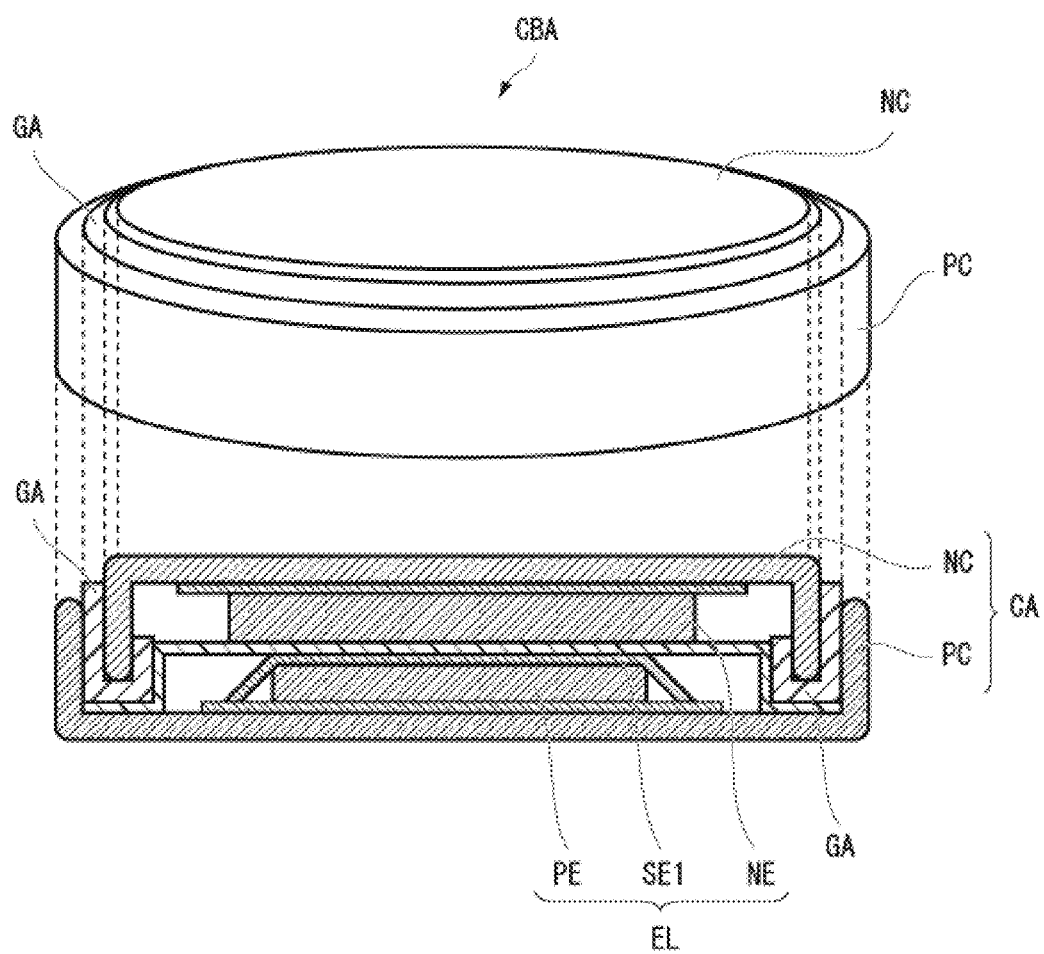
FIG. 7 is a schematic sectional view of a coin type battery used in a battery evaluation.

To evaluate the positive electrode active material, the 2032-type coin battery CBA (hereinafter referred to as coil type battery) illustrated in FIG. 7 was used. The coin type battery CBA includes an electrode EL and a case CA for housing this electrode EL inside as illustrated in FIG. 7. The electrode EL includes a positive electrode PE, a separator SE1, and a negative electrode NE, which are stacked in this order and housed in the case CA so that the positive electrode PE is in contact with an inner surface of a positive electrode can PC, and the negative electrode NE is in contact with an inner surface of a negative electrode can NC.

The case CA includes the positive electrode can PC that is hollow and has one end open, and the negative electrode can NC disposed at the opening part of this positive electrode can PC and is configured so that when the negative electrode can NC is disposed at the opening part of the positive electrode can PC, a space for housing the electrode EL is formed between the negative electrode can NC and the positive electrode can PC. The case CA includes a gasket GA, and by this gasket GA, the relative movement is fixed so that the positive electrode can PC and the negative electrode can NC remain in the non-contact state. The gasket GA also functions to seal the gap between the positive electrode can PC and the negative electrode can NC, thereby blocking between the case CA and the outside in the air-tight and liquid-tight manner.

The coin type battery CBA was produced as below.

First, 52.5 mg of the positive electrode active material for a nonaqueous electrolyte battery, 15 mg of acetylene black, and 7.5 mg of polytetrafluoroethylene resin (PTFE) were mixed, and the mixture was press-molded with a pressure of 100 MPa into the positive electrode PE with a diameter of 11 mm and a thickness of 100 μm. The produced positive electrode PE was dried in a vacuum drier at 120° C. for 12 hours. With the use of this positive electrode PE, the negative electrode NE, the separator SE1, and the electrolyte solution, the coin type battery CBA was produced in a glove box with an Ar atmosphere whose dew point was controlled to be −80° C.

Note that a negative electrode sheet punched into a disc-like shape with a diameter of 14 mm and formed by applying graphite powder and polyvinylidene fluoride with an average particle diameter of approximately 20 μm on a copper foil was used as the negative electrode NE. For the separator SE1, a polyethylene porous film with a thickness of 25 μm was used. For the electrolyte solution, a mixed solution containing the same amount of diethyl carbonate (DEC) and ethylene carbonate (EC) using 1 M of $LiClO_4$ as the supporting electrolyte was used (manufactured by TOMIYAMA PURE CHEMICAL INDUSTRIES, LTD.).

The initial discharging capacity and positive electrode resistance expressing the performance of the produced coin type battery were evaluated as below. The produced coin battery CBA was left for about 24 hours and after open circuit voltage OCV became stable, the coin battery BA was charged up to a cutoff voltage of 4.3 V with a current density to the positive electrode set to 0.1 $mA/cm^2$. After a one-hour rest, the coin battery CBA was discharged until a cutoff voltage of 3.0 V. The capacity of this discharged coin battery was obtained as the initial discharging capacity.

The coin type battery CBA was charged with a charging potential of 4.1 V and the positive resistance was measured by the alternating current impedance method by using a frequency response analyzer and a potentio-galvanostat (1255B manufactured by Solartron), and the Nyquist plots illustrated in FIG. 6 were obtained. The Nyquist plots illustrate the sum of characteristic curves expressing the solution resistance, the negative electrode resistance, and the capacity thereof, and the positive electrode resistance and the capacity thereof. Therefore, based on the Nyquist plots, the fitting calculation was performed using the equivalent circuit and the value of the positive electrode resistance was calculated. Note that the positive electrode resistance was calculated as the relative value assuming that the value of Comparative Example 1 was "1.00".

In this Example, each sample of the special grade chemicals manufactured by Wako Pure Chemical Industries, Ltd. was used in the production of the composite hydroxide, the positive electrode active material, and the secondary battery.

Example 1

[Production of Positive Electrode Active Material]
(Production of First Composite Oxide Particles)

Powder of lithium nickel composite oxide particles represented by $Li_{1.020}Ni_{0.91}Co_{0.06}Al_{0.03}O_2$ obtained by mixing lithium hydroxide and oxide mainly containing Ni and firing the mixture according to a known technique was used as the base material. To 500 g of the base material, 500 mL of pure water at a temperature of 25° C. was added and slurry was formed. The slurry was stirred for 15 minutes and then water-washing was performed. The water-washed slurry was filtered using a Nutsche to be separated into the solid and the liquid. The obtained washed cake contained water by 8.5% by mass.

Tungsten oxide ($WO_3$) was added by 3.58 g to the washed cake so that the amount of tungsten became 0.30 at % relative to the total number of atoms of Ni, Co, and Al contained in the base material, and the mixture was mixed sufficiently using a shaker mixer (TURBULA Type T2C, manufactured by Willy A. Bachofen (WAB)), and the tungsten mixture was obtained.

The obtained tungsten mixture was put into an aluminum bag and purged with a nitrogen gas, and then laminated. Subsequently, the tungsten mixture was put into a drier heated to 80° C. for about an hour. After the heating, the tungsten mixture was taken out of the aluminum bag and put into a SUS container. Then, using a vacuum drier heated to 190° C., the tungsten mixture was dried for 10 hours in the stationary state (heat treatment) and then cooled in a furnace.

The obtained dried tungsten mixture was pulverized with a sieve with a mesh of 38 μm, and the lithium nickel composite oxide particles (first composite oxide particles) having the lithium tungstate compound on the surface of the primary particles of the core material (base material) was obtained. It has been demonstrated that the obtained first composite oxide particles contained 0.05% by mass or less of excess lithium (the amount of lithium contained in the lithium compound other than lithium tungstate).

(Production of Second Composite Oxide Particles)

To 500 g of the powder of lithium nickel composite oxide particles represented by $Li_{1.020}Ni_{0.91}Co_{0.06}Al_{0.03}O_2$ obtained by mixing lithium hydroxide and oxide mainly containing Ni and firing the mixture according to a known technique, 667 mL of pure water at a temperature of 25° C. was added to form slurry, and water-washing was performed for 15 minutes. After the slurry was separated into the solid and the liquid, the slurry was dried and the second composite oxide particles were obtained. It has been demonstrated that the obtained second composite oxide particles contained 0.05% by mass or less of excess lithium.

(Mixing of First Composite Oxide Particles and Second Composite Oxide Particles)

To 300 g of the obtained lithium nickel composite oxide particles (first composite oxide particles), 300 g of the lithium nickel composite oxide not containing the lithium tungstate compound (second composite oxide particles) was added, the mixture was mixed sufficiently using a shaker mixer device (TURBULA Type T2C, manufactured by Willy A. Bachofen (WAB)), and the positive electrode active material was obtained. The amount of tungsten contained in the obtained positive electrode active material was analyzed by the ICP method and the results have revealed that the amount of contained tungsten was 0.15 at % relative to the total number of atoms of Ni, Co, and Al. Further, it has been demonstrated that the obtained positive electrode active material contained sulfate radicals by 0.05% by mass or less.

[Analysis of Excess Lithium]

The excess lithium of the obtained positive electrode active material was evaluated by titrating lithium eluted from the positive electrode active material. To 1 g of the obtained positive electrode active material, 10 ml of pure water was added and the mixture was stirred for 1 minute. The mixture was filtered and a filtrate was obtained. A hydrochloric acid was added to the filtrate while the pH was measured, and the state of the lithium compound that was eluted after the point of neutralization was analyzed and the excess lithium amount was evaluated. The excess lithium amount was 0.02% by mass relative to the total amount of the positive electrode active material.

[Battery Evaluation]

The battery characteristic of the coin type battery CBA having the positive electrode produced by using the obtained positive electrode active material was evaluated. The evaluation value of the positive electrode resistance was determined to be a relative value to that of Comparative Example 1 "1.00". The initial discharging capacity was 213.1 mAh/g.

Examples and Comparative Examples will be described below in regard to only the materials and conditions that are different from those of Comparative Example 1. The evaluation values of the initial discharging capacity and the positive electrode resistance of Examples and Comparative Examples will be listed together in Table 1 and Table 2.

Example 2

A tungsten mixture was obtained by performing the mixing sufficiently using a shaker mixer device (TURBULA Type T2C, manufactured by Willy A. Bachofen (WAB)) in a manner similar to Example 1 except that 5.37 g of tungsten oxide ($WO_3$) was added to the washed cake so that the amount of tungsten relative to the total number of atoms of Ni, Co, and Al contained in the lithium nickel composite oxide (base material) became 0.45 at %.

The obtained mixture was put into an aluminum bag and purged with a nitrogen gas, and then laminated. The mixture was put into a drier heated to 80° C. for about an hour. After the heating, the mixture was taken out of the aluminum bag and then placed into a SUS container. Next, the mixture was dried for 10 hours in the stationary state using a vacuum drier heated to 190° C., and then cooled in a furnace.

The obtained dried tungsten mixture was pulverized with a sieve with a mesh of 38 μm, and the lithium nickel composite oxide particles (first composite oxide) having the lithium tungstate compound on the surface of the primary particles of the core material (base material) was obtained. To 300 g of the obtained lithium nickel composite oxide (first composite oxide), 600 g of the lithium nickel composite oxide not containing the lithium tungstate compound (second composite oxide particles) obtained in a manner similar to Example 1 was added, the mixture was mixed sufficiently using a shaker mixer device (TURBULA Type T2C, manufactured by Willy A. Bachofen (WAB)), and the positive electrode active material was obtained.

The amount of tungsten contained in the obtained positive electrode active material was analyzed by the ICP method and the results have revealed that the amount of contained tungsten was 0.15 at % relative to the total number of atoms of Ni, Co, and Al.

Example 3

A tungsten mixture was obtained by performing the mixing sufficiently using a shaker mixer device (TURBULA Type T2C, manufactured by Willy A. Bachofen (WAB)) in a manner similar to Example 1 except that 8.98 g of tungsten oxide ($WO_3$) was added to the washed cake so that the amount of tungsten relative to the total number of atoms of Ni, Co, and Al contained in the lithium nickel composite oxide (base material) became 0.75 at %.

The obtained mixture was put into an aluminum bag and purged with a nitrogen gas, and then laminated. The mixture was put into a drier heated to 80° C. for about an hour. After the heating, the mixture was taken out of the aluminum bag and then placed into a SUS container. Next, the mixture was dried for 10 hours in the stationary state using a vacuum drier heated to 190° C., and then cooled in a furnace.

The obtained dried tungsten mixture was pulverized with a sieve with a mesh of 38 μm, and the lithium nickel composite oxide (first composite oxide) having the lithium tungstate compound obtained in a manner similar to Example 1 on the surface of the primary particles of the core material (base material) was obtained.

To 300 g of the obtained composite oxide (first composite oxide), 1,200 g of the lithium nickel composite oxide not containing the lithium tungstate compound (second composite oxide particles) was added, the mixture was mixed sufficiently using a shaker mixer device (TURBULA Type T2C, manufactured by Willy A. Bachofen (WAB)), and the positive electrode active material was obtained.

The amount of tungsten contained in the obtained positive electrode active material was analyzed by the ICP method and the results have revealed that the amount of contained tungsten was 0.15 at % relative to the total number of atoms of Ni, Co, and Al.

Example 4

To 500 g of the base material, 667 mL of pure water at a temperature of 25° C. was added to form slurry and water-washing was performed for 15 minutes. After the water-washing, the slurry was filtered using a Nutsche to be separated into the solid and the liquid. The washed cake contained water by 8.5% by mass.

Lithium tungstate (LWO:$Li_2WO_4$) was added by 4.04 g to the washed cake so that the amount of tungsten became 0.30 at % relative to the total number of atoms of Ni, Co, and Al contained in the lithium nickel composite oxide (base material), and the mixture was mixed sufficiently using a shaker mixer (TURBULA Type T2C, manufactured by Willy A. Bachofen (WAB)), and the tungsten mixture was obtained.

The obtained tungsten mixture was put into an aluminum bag and purged with a nitrogen gas, and then laminated. Subsequently, the tungsten mixture was put into a drier heated to 80° C. for about an hour. After the heating, the tungsten mixture was taken out of the aluminum bag and put into a SUS container. Then, using a vacuum drier heated to 190° C., the tungsten mixture was dried for 10 hours in the stationary state and then cooled in a furnace.

The obtained dried tungsten mixture was pulverized with a sieve with a mesh of 38 μm, and the lithium nickel composite oxide (first composite oxide) having the lithium tungstate compound on the surface of the primary particles of the core material (base material) was obtained.

To 300 g of the obtained composite oxide (first composite oxide), 300 g of the lithium nickel composite oxide not containing the lithium tungstate compound (second composite oxide particles) obtained in a manner similar to Example 1 was added, the mixture was mixed sufficiently using a shaker mixer device (TURBULA Type T2C, manufactured by Willy A. Bachofen (WAB)), and the mixed positive electrode active material was obtained.

The amount of tungsten contained in the obtained positive electrode active material was analyzed by the ICP method and the results have revealed that the amount of contained tungsten was 0.15 at % relative to the total number of atoms of Ni, Co, and Al.

Example 5

To 500 g of the base material, 667 mL of pure water at a temperature of 25° C. was added to form slurry and water-washing was performed for 15 minutes. After the water-washing, the slurry was filtered using a Nutsche to be separated into the solid and the liquid. The washed cake contained water by 8.5% by mass.

Lithium tungstate (LWO:$Li_2WO_4$) was added by 6.06 g to the washed cake so that the amount of tungsten became 0.45 at % relative to the total number of atoms of Ni, Co, and Al contained in the lithium nickel composite oxide (base material), the mixture was mixed sufficiently using a shaker mixer (TURBULA Type T2C, manufactured by Willy A. Bachofen (WAB)), and the tungsten mixture was obtained.

The obtained tungsten mixture was put into an aluminum bag and purged with a nitrogen gas, and then laminated. Subsequently, the tungsten mixture was put into a drier heated to 80° C. for about an hour. After the heating, the tungsten mixture was taken out of the aluminum bag and put into a SUS container. Then, using a vacuum drier heated to 190° C., the tungsten mixture was dried for 10 hours in the stationary state and then cooled in a furnace.

The obtained dried tungsten mixture was pulverized with a sieve with a mesh of 38 μm, and the lithium nickel composite oxide having the lithium tungstate compound (first composite oxide) on the surface of the primary particles of the core material (base material) was obtained.

To 300 g of the obtained composite oxide (first composite oxide), 600 g of the lithium nickel composite oxide not containing the lithium tungstate compound (second composite oxide particles) obtained in a manner similar to Example 1 was added, the mixture was mixed sufficiently using a shaker mixer device (TURBULA Type T2C, manufactured by Willy A. Bachofen (WAB)), and the positive electrode active material was obtained.

The amount of tungsten contained in the obtained positive electrode active material was analyzed by the ICP method and the results have revealed that the amount of contained tungsten was 0.15 at % relative to the total number of atoms of Ni, Co, and Al Example 6

To 500 g of the base material, 667 mL of pure water at a temperature of 25° C. was added to form slurry and water-washing was performed for 15 minutes. After the water-washing, the slurry was filtered using a Nutsche to be separated into the solid and the liquid. The washed cake contained water by 8.5% by mass.

Lithium tungstate (LWO:$Li_2WO_4$) was added by 10.14 g to the washed cake so that the amount of tungsten became 0.75 at % relative to the total number of atoms of Ni, Co, and Al contained in the lithium nickel composite oxide (base material), the mixture was mixed sufficiently using a shaker mixer (TURBULA Type T2C, manufactured by Willy A. Bachofen (WAB)), and the tungsten mixture was obtained.

The obtained tungsten mixture was put into an aluminum bag and purged with a nitrogen gas, and then laminated. Subsequently, the tungsten mixture was put into a drier heated to 80° C. for about an hour. After the heating, the tungsten mixture was taken out of the aluminum bag and put into a SUS container. Then, using a vacuum drier heated to 190° C., the tungsten mixture was dried for 10 hours in the stationary state and then cooled in a furnace.

The obtained dried tungsten mixture was pulverized with a sieve with a mesh of 38 μm, and the lithium nickel composite oxide having the lithium tungstate compound (first composite oxide) on the surface of the primary particles of the core material (base material) was obtained.

To 300 g of the obtained composite oxide (first composite oxide), 1,200 g of the lithium nickel composite oxide not containing the lithium tungstate compound (second composite oxide particles) obtained in a manner similar to Example 1 was added, the mixture was mixed sufficiently using a shaker mixer device (TURBULA Type T2C, manufactured by Willy A. Bachofen (WAB)), and the mixed positive electrode active material was obtained.

The amount of tungsten contained in the obtained positive electrode active material was analyzed by the ICP method and the results have revealed that the amount of contained tungsten was 0.15 at % relative to the total number of atoms of Ni, Co, and Al.

Comparative Example 1

Composite oxide particles (corresponding to the second composite oxide) were obtained as the positive electrode active material in a manner similar to the first composite oxide according to Example 1 except that 500 mL of pure water at a temperature of 25° C. was added to 500 g of lithium nickel composite oxide particles with the composition similar to that of the aforementioned base material to form slurry and that a tungsten compound was not added to the washed cake obtained after the solid-liquid separation.

Comparative Example 2

Composite oxide particles (corresponding to the second composite oxide) were obtained as the positive electrode active material in a manner similar to the first composite oxide according to Example 1 except that 667 mL of pure water at a temperature of 25° C. was added to 500 g of lithium nickel composite oxide particles with the composition similar to that of the aforementioned base material to form slurry and that a tungsten compound was not added to the washed cake obtained after the solid-liquid separation.

Comparative Example 3

Composite oxide particles (corresponding to the second composite oxide) were obtained in a manner similar to the first composite oxide according to Example 1 except that 667 mL of pure water at a temperature of 25° C. was added to 500 g of the base material to form slurry and that a tungsten compound was not added to the washed cake obtained after the solid-liquid separation. To the obtained composite oxide particles (corresponding to the second composite oxide), 2.0 g of powder of lithium tungstate (LWO:$Li_2WO_4$) was added, the mixture was mixed sufficiently using a shaker mixer device (TURBULA Type T2C, manufactured by Willy A. Bachofen (WAB)), and the positive electrode active material was obtained.

The amount of tungsten contained in the obtained positive electrode active material was analyzed by the ICP method and the results have revealed that the amount of contained tungsten was 0.15 at % relative to the total number of atoms of Ni, Co, and Al.

TABLE 1

| | | | | Example 1 | Example 2 | Example 3 | Example 4 | Example 5 | Example 6 |
|---|---|---|---|---|---|---|---|---|---|
| First composite oxide particle | Base material | Composition (before water-washing) | | $Li_{1.020}Ni_{0.91}Co_{0.06}Al_{0.03}O_2$ | | | | | |
| | | Slurry concentration | [g/L] | 1000 | 1000 | 1000 | 750 | 750 | 750 |
| | | Base material (after water-washing) | | $Li_{0.985}Ni_{0.91}Co_{0.06}Al_{0.03}O_2$ | | | $Li_{0.983}Ni_{0.91}Co_{0.06}Al_{0.03}O_2$ | | |
| | Tungsten mixture | Water content | [% by mass] | 8.5 | 8.5 | 8.5 | 8.5 | 8.5 | 8.5 |
| | | W source | | $WO_3$ | $WO_3$ | $WO_3$ | LWO | LWO | LWO |
| | | W concentration | [at %] | 0.30 | 0.45 | 0.75 | 0.30 | 0.45 | 0.75 |
| | | Li molar ratio | (Li/W) | — | — | — | 2.0 | 2.0 | 2.0 |
| | | Content | % | 50 | 33 | 20 | 50 | 33 | 20 |
| Second composite oxide particle | Slurry concentration | | [g/L] | 750 | 750 | 750 | 750 | 750 | 750 |
| | Composition after water-washing | | | $Li_{0.983}Ni_{0.91}Co_{0.06}Al_{0.03}O_2$ | | | | | |
| | Content | | [%] | 50 | 67 | 80 | 50 | 67 | 80 |
| Positive | W content | | [at %] | 0.15 | 0.15 | 0.15 | 0.15 | 0.15 | 0.15 |

TABLE 1-continued

|  |  |  | Example 1 | Example 2 | Example 3 | Example 4 | Example 5 | Example 6 |
|---|---|---|---|---|---|---|---|---|
| electrode active material | Excess Li | [% by mass] | 0.03 | 0.02 | 0.02 | 0.03 | 0.02 | 0.02 |
|  | Initial discharging capacity | [mAh/g] | 213.1 | 212.3 | 210.0 | 213.1 | 211.9 | 209.2 |
|  | Initial positive electrode resistance | [−] | 0.65 | 0.71 | 0.81 | 0.56 | 0.62 | 0.71 |

TABLE 2

|  |  |  |  | Comparative Example 1 | Comparative Example 2 | Comparative Example 3 |
|---|---|---|---|---|---|---|
| First composite oxide particle | Base material | Composition (before water-washing) |  | — | — | — |
|  |  | Slurry concentration | [g/L] | — | — | — |
|  |  | Base material (after water-washing) |  | — | — | — |
|  | Tungsten mixture | Water content | [% by mass] | — | — | — |
|  |  | W source |  | — | — | — |
|  |  | W concentration | [at %] | — | — | — |
|  |  | Li molar ratio | (Li/W) | — | — | — |
|  |  | Content | % | 0 | 0 | 0 |
| Second composite oxide particle | Slurry concentration | [g/L] |  | 1000 | 750 | 750 |
|  | Composition after water-washing |  |  | $Li_{0.985}Ni_{0.91}Co_{0.06}Al_{0.03}O_2$ |  | $Li_{0.983}Ni_{0.91}Co_{0.06}Al_{0.03}O_2$ |
|  | content | [%] |  | 100 | 100 | 100 |
| Positive electrode active material | W content | [at %] |  | — | — | 0.15 |
|  | Excess Li | [% by mass] |  | 0.03 | 0.02 | 0.03 |
|  | Initial discharging capacity | [mAh/g] |  | 209.0 | 207.9 | 208.3 |
|  | Initial positive electrode resistance | [−] |  | 1.00 | 1.08 | 0.89 |

[Evaluation]

As is clear from Table 1 and Table 2, the positive electrode active materials according to Examples were produced in accordance with the present invention; therefore, the initial charging-discharging capacity is high and the positive electrode resistance is low. The battery characteristics are superior to that of Comparative Examples 1 and 2. FIG. 3 illustrates one example of the result of observing the sectional SEM photograph of the positive electrode active material obtained in Example according to the present invention. It has been demonstrated that the obtained positive electrode active material includes the primary particles and the secondary particle formed by an aggregation of the primary particles and that lithium tungstate is formed on the surface of the primary particles. The microparticles containing lithium tungstate are circled in FIG. 3.

On the other hand, in Comparative Examples 1 and 2, the microparticles containing lithium tungstate are not formed on the surface of the primary particles and therefore, the positive electrode resistance is significantly high. Therefore, it is difficult to deal with the demand for the higher output energy. In addition, in Comparative Example 3, the resistance reducing effect is obtained by adding lithium tungstate but since the lithium tungstate compound is not formed on the surface of the primary particles of the lithium nickel composite oxide, the battery has a low initial discharging capacity.

INDUSTRIAL APPLICABILITY

A nonaqueous electrolyte secondary battery including the positive electrode active material according to the present invention is suitably used for a power source of a compact portable electronic device (such as a laptop computer or a mobile phone) always required to have high capacity, and can also be used for a battery for electric vehicles required to have high output energy. Moreover, the nonaqueous electrolyte secondary battery according to the present invention possesses excellent safety and can have smaller size and higher output energy; therefore, the nonaqueous electrolyte secondary battery according to the present invention can be suitably used for the power source for electric vehicles in which the installation space is limited. Note that the nonaqueous electrolyte secondary battery according to the present invention can be used not only for the power source for electric vehicles that are driven solely on the electric energy but also for the power source for hybrid vehicles that are driven, combined with a combustion engine such as a gasoline engine or a diesel engine.

DESCRIPTION OF REFERENCE SIGNS

1 First lithium nickel composite oxide
2 Second lithium nickel composite oxide
3, 3a, 3b Primary particle (first lithium nickel composite oxide)

4 Secondary particle (first lithium nickel composite oxide)
5 Core material
6, 6a, 6b Lithium tungstate
7 Primary particle (second lithium nickel composite oxide)
8 Secondary particle (second lithium nickel composite oxide)
10 Positive electrode active material
CBA Coin type battery
CA Case
PC Positive electrode can
NC Negative electrode can
GA Gasket
EL Electrode
PE Positive electrode
NE Negative electrode
SE1 Separator

The invention claimed is:

1. A positive electrode active material for a nonaqueous electrolyte secondary battery, the positive electrode active material comprising first lithium nickel composite oxide particles containing lithium tungstate and second lithium nickel composite oxide particles not containing lithium tungstate, wherein
the first lithium nickel composite oxide particles have a composition represented by $Li_{z1}Ni_{1-x1-y1}Co_{x1}M^1_{y1}O_2$ where $0 \leq x1 \leq 0.35$, $0 \leq y1 \leq 0.35$, $0.95 \leq z1 \leq 1.15$, and $M^1$ is at least one element selected from Mn, V, Mg, Mo, Nb, Ti, and Al, and include a core material containing secondary particles each corresponding to an aggregation of a plurality of primary particles, and the lithium tungstate existing on at least a part of a surface of the primary particles on a surface of and inside the first lithium nickel composite oxide particles,
the second lithium nickel composite oxide particles have a composition represented by $Li_{z2}Ni_{1-x2-y2}Co_{x2}M^2_{y2}O_2$ where $0 \leq x2 \leq 0.35$, $0 \leq y2 \leq 0.35$, $0.95 \leq z2 \leq 1.15$, and $M^2$ is at least one element selected from Mn, V, Mg, Mo, Nb, Ti, and Al, and include secondary particles each corresponding to an aggregation of a plurality of primary particles, and
an amount of the first lithium nickel composite oxide particles contained in the positive electrode active material is 10% by mass or more and 70% by mass or less relative to the total amount of the positive electrode active material.

2. The positive electrode active material for a nonaqueous electrolyte secondary battery according to claim 1, wherein the amount of lithium contained in a lithium compound other than lithium tungstate existing on a surface of the primary particles on a surface of and inside both the first lithium nickel composite oxide particles and the second lithium nickel composite oxide particles is 0.05% by mass or less relative to the total amount of the positive electrode active material.

3. The positive electrode active material for a nonaqueous electrolyte secondary battery according to claim 1, wherein the positive electrode active material contains the first lithium nickel composite oxide particles by 10% by mass or more and 60% by mass or less relative to the total amount of the positive electrode active material.

4. The positive electrode active material for a nonaqueous electrolyte secondary battery according to claim 1, wherein the lithium tungstate contains tungsten by 0.03 at % or more and 2.5 at % or less relative to the total number of atoms of Ni, Co, and M contained in the positive electrode active material.

5. The positive electrode active material for a nonaqueous electrolyte secondary battery according to claim 1, wherein the lithium tungstate contains tungsten by 0.05 at % or more and 3.0 at % or less relative to the total number of atoms of Ni, Co, and M contained in the first lithium nickel composite oxide particles.

6. The positive electrode active material for a nonaqueous electrolyte secondary battery according to claim 1, wherein the lithium tungstate exists as a microparticle with a particle diameter of 1 nm or larger and 500 nm or smaller on the surface of the primary particles on the surface of and inside the first lithium nickel composite oxide particles.

7. The positive electrode active material for a nonaqueous electrolyte secondary battery according to claim 1, wherein the lithium tungstate exists as a film with a thickness of 1 nm or larger and 200 nm or smaller on the surface of the primary particles on the surface of and inside the first lithium nickel composite oxide particles.

8. The positive electrode active material for a nonaqueous electrolyte secondary battery according to claim 1, wherein the lithium tungstate exists both as a microparticle with a particle diameter of 1 nm or larger and 500 nm or smaller and as a film with a thickness of 1 nm or larger and 200 nm or smaller on the surface of the primary particles on the surface of and inside the first lithium nickel composite oxide particles.

9. A nonaqueous electrolyte secondary battery comprising a positive electrode containing the positive electrode active material for a nonaqueous electrolyte secondary battery according to claim 1.

10. A method for producing a positive electrode active material of claim 1 for a nonaqueous electrolyte secondary battery, the method comprising mixing first lithium nickel composite oxide particles containing lithium tungstate and second lithium nickel composite oxide particles not containing lithium tungstate, wherein
the first lithium nickel composite oxide particles have a composition represented by $Li_{z1}Ni_{1-x1-y1}Co_{x1}M^1_{y1}O_2$ (where $0 \leq x1 \leq 0.35$, $0 \leq y1 \leq 0.35$, $0.95 \leq z1 \leq 1.15$, and $M^1$ is at least one element selected from Mn, V, Mg, Mo, Nb, Ti, and Al), and include a core material containing secondary particles each corresponding to an aggregation of a plurality of primary particles, and the lithium tungstate existing on at least a part of a surface of the primary particles on a surface of and inside the first lithium nickel composite oxide particles, and
the second lithium nickel composite oxide particles have a composition represented by $Li_{z2}Ni_{1-x2-y2}Co_{x2}M^2_{y2}O_2$ (where $0 \leq x2 \leq 0.35$, $0 \leq y2 \leq 0.35$, $0.95 \leq z2 \leq 1.15$, and $M^2$ is at least one element selected from Mn, V, Mg, Mo, Nb, Ti, and Al), and include secondary particles each corresponding to an aggregation of a plurality of primary particles.

11. The method for producing a positive electrode active material for a nonaqueous electrolyte secondary battery according to claim 10, wherein the second lithium nickel composite oxide particles are washed with water before the mixing.

12. The method for producing a positive electrode active material for a nonaqueous electrolyte secondary battery according to claim 11, wherein in the washing with water, slurry has a concentration of 500 g/L or higher and 2,500 g/L or lower.

13. The method for producing a positive electrode active material for a nonaqueous electrolyte secondary battery according to claim 10, wherein the amount of lithium contained in a lithium compound other than the lithium tungstate existing on the surface of the primary particles on a surface of and inside both the first lithium nickel composite oxide particles and the second lithium nickel composite oxide particles is 0.05% by mass or less relative to the total amount of the positive electrode active material.

14. The method for producing a positive electrode active material for a nonaqueous electrolyte secondary battery according to claim 10, wherein the first lithium nickel composite oxide particles and the second lithium nickel composite oxide particles are mixed so that the positive electrode active material contains the first lithium nickel composite oxide particles by 10% by mass or more relative to the total amount of the positive electrode active material.

15. The method for producing a positive electrode active material for a nonaqueous electrolyte secondary battery according to claim 10, wherein the first lithium nickel composite oxide particles and the second lithium nickel composite oxide particles are mixed so that the first lithium nickel composite oxide particles contain tungsten by 0.03 at % or more and 2.5 at % or less relative to the total number of atoms of Ni, Co, and M contained in the positive electrode active material.

16. The method for producing a positive electrode active material for a nonaqueous electrolyte secondary battery according to claim 10, the method further comprising: before the mixing, preparing a tungsten mixture containing
a base material whose composition is represented by $Li_{z3}Ni_{1-x3-y3}Co_{x3}M^1_{y3}O_2$ (where $0.00 \leq x3 \leq 0.35$, $0.00 \leq y3 \leq 0.35$, $0.95 \leq z3 \leq 1.20$, and $M^1$ is at least one element selected from Mn, V, Mg, Mo, Nb, Ti, and Al) and that includes secondary particles each corresponding to an aggregation of a plurality of primary particles,
water of 2% by mass or more relative to the total amount of the base material, and
a tungsten compound or a tungsten compound and a lithium compound not containing a tungsten; and
obtaining the first lithium nickel composite oxide particles by performing heat treatment on the obtained tungsten mixture to form the lithium tungstate on the surface of the primary particles on a surface of and inside the base material, wherein
in the tungsten mixture, a molar ratio of the total amount of lithium contained in the water and the tungsten compound or in the water, the tungsten compound, and the lithium compound relative to the total amount of contained tungsten is 5 or lower.

17. The method for producing a positive electrode active material for a nonaqueous electrolyte secondary battery according to claim 16, wherein the amount of lithium contained in the lithium compound other than the lithium tungstate existing on the surface of the primary particles on the surface of and inside the first lithium nickel composite oxide particles is 0.05% by mass or less relative to the first lithium nickel composite oxide particles.

18. The method for producing a positive electrode active material for a nonaqueous electrolyte secondary battery according to claim 16, the method comprising:
before the heat treatment, washing the base material with water by mixing the base material and water to form slurry; and
separating the washed base material into a solid and a liquid.

19. The method for producing a positive electrode active material for a nonaqueous electrolyte secondary battery according to claim 18, wherein the slurry formed by mixing the base material and water has a concentration of 500 g/L or higher and 2,500 g/L or lower.

20. The method for producing a positive electrode active material for a nonaqueous electrolyte secondary battery according to claim 18, wherein the water content of a washed cake obtained when the base material washed with water is separated into the solid and the liquid is controlled to be in a range of 3.0% by mass or more and 15.0% by mass or less.

21. The method for producing a positive electrode active material for a nonaqueous electrolyte secondary battery according to claim 16, wherein the tungsten compound contains at least one of tungsten oxide ($WO_3$), tungstic acid ($WO_3 \cdot H_2O$), $Li_2WO_4$, $Li_4WO_5$, and $Li_6W_2O_9$.

22. The method for producing a positive electrode active material for a nonaqueous electrolyte secondary battery according to claim 16, wherein the heat treatment is performed at 100° C. or higher and 600° C. or lower.

23. The method for producing a positive electrode active material for a nonaqueous electrolyte secondary battery according to claim 16, wherein the amount of tungsten contained in the tungsten compound is 0.05 at % or more and 3.0 at % or less relative to the total number of atoms of Ni, Co, and M contained in the base material.

* * * * *